(12) United States Patent
Aoki et al.

(10) Patent No.: US 10,921,340 B2
(45) Date of Patent: Feb. 16, 2021

(54) LIQUID FEEDING METHOD, AND DETECTION SYSTEM AND DETECTION DEVICE FOR CARRYING OUT SAID METHOD

(71) Applicant: Konica Minolta, Inc., Tokyo (JP)

(72) Inventors: Youichi Aoki, Saitama (JP); Atsuo Iwashita, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 420 days.

(21) Appl. No.: 16/072,741

(22) PCT Filed: Jan. 28, 2016

(86) PCT No.: PCT/JP2016/052542
§ 371 (c)(1),
(2) Date: Jul. 25, 2018

(87) PCT Pub. No.: WO2017/130359
PCT Pub. Date: Aug. 3, 2017

(65) Prior Publication Data
US 2019/0033335 A1   Jan. 31, 2019

(51) Int. Cl.
*G01N 35/10* (2006.01)
*G01N 1/00* (2006.01)
(Continued)

(52) U.S. Cl.
CPC ...... *G01N 35/1011* (2013.01); *B01L 3/50273* (2013.01); *B01L 3/502715* (2013.01);
(Continued)

(58) Field of Classification Search
None
See application file for complete search history.

(56) References Cited

U.S. PATENT DOCUMENTS 5,452,619 A * 9/1995 Kawanabe ........... G01N 33/491
                                              73/863
5,840,573 A * 11/1998 Fields .................... B01L 3/502
                                              435/287.2
(Continued)

FOREIGN PATENT DOCUMENTS

EP       3064943 A1    9/2016
JP    2012159358 A     8/2012
(Continued)

OTHER PUBLICATIONS

Extended European Search Report dated Oct. 24, 2018 from corresponding European Application No. 16887946.8.
(Continued)

*Primary Examiner* — Jill A Warden
*Assistant Examiner* — Brittany I Fisher
(74) *Attorney, Agent, or Firm* — Lucas & Mercanti, LLP

(57) ABSTRACT

A detection chip comprises a flow path and a liquid injection unit connected to one end of the flow path, and by means of a pipette chip inserted into the liquid injection unit of the detection chip, the liquid in the liquid injection unit is aspirated to remove the liquid in the flow path. Subsequently, the pipette chip is made to carry out a reciprocating motion two or more times along the axial direction of the pipette chip, and at least one of those times, the fluid in the liquid injection unit is aspirated by the pipette chip. Subsequently, a liquid is injected from the pipette chip into the liquid injection unit, and the liquid is introduced into the flow path.

11 Claims, 13 Drawing Sheets

(51) Int. Cl.
    *B01L 3/00*         (2006.01)
    *G01N 21/64*      (2006.01)
    *G01N 21/11*      (2006.01)
    *B01L 9/00*         (2006.01)
    *G01N 21/03*      (2006.01)
    *B01L 3/02*         (2006.01)

(52) U.S. Cl.
    CPC ............... B01L 9/527 (2013.01); G01N 1/00 (2013.01); G01N 21/11 (2013.01); G01N 21/648 (2013.01); G01N 21/6428 (2013.01); G01N 35/10 (2013.01); *B01L 3/021* (2013.01); *B01L 2200/027* (2013.01); *B01L 2200/0605* (2013.01); *B01L 2200/0689* (2013.01); *B01L 2200/143* (2013.01); *B01L 2400/0406* (2013.01); *B01L 2400/0481* (2013.01); *G01N 2021/0346* (2013.01); *G01N 2021/6439* (2013.01); *G01N 2021/6482* (2013.01)

(56) References Cited

U.S. PATENT DOCUMENTS

| | | | | |
|---|---|---|---|---|
| 7,479,391 | B2* | 1/2009 | Bjornson | G01N 35/1009 422/417 |
| 2003/0157503 | A1* | 8/2003 | McGarry | B01L 3/502723 435/6.11 |
| 2006/0228263 | A1* | 10/2006 | Berndtsson | B01L 3/502715 422/514 |
| 2006/0263263 | A1* | 11/2006 | Shimizu | G01N 21/05 422/68.1 |
| 2012/0156800 | A1* | 6/2012 | Aoki | G01N 21/648 436/180 |
| 2013/0312546 | A1* | 11/2013 | Wada | G01N 33/48707 73/864.11 |
| 2014/0118747 | A1* | 5/2014 | Aoki | G01N 21/553 356/445 |
| 2016/0245803 | A1 | 8/2016 | Murayama et al. | |
| 2017/0095190 | A1* | 4/2017 | Sloan | A61B 5/150343 |

FOREIGN PATENT DOCUMENTS

| | | |
|---|---|---|
| JP | 5545233 B2 | 7/2014 |
| WO | 2011027851 A1 | 3/2011 |

OTHER PUBLICATIONS

International Search Report dated Apr. 19, 2016 for PCT/JP2016/052542.

* cited by examiner

20# LIQUID FEEDING METHOD, AND DETECTION SYSTEM AND DETECTION DEVICE FOR CARRYING OUT SAID METHOD

CROSS REFERENCE TO RELATED APPLICATION

This Application is a 371 of PCT/JP2016/052542 filed on Jan. 28, 2016 which is incorporated herein by reference.

TECHNICAL FIELD

The present invention relates to a liquid feeding method of supplying liquid to a micro flow path, and a detection system and a detection apparatus that achieve this supply.

BACKGROUND ART

A biochemical reaction, such as an antigen-antibody reaction, is utilized for a biochemical examination. For example, fluoroimmunoassays (hereinafter also called "FIAs") react a labeling substance that contains a fluorescent substance with a detection target substance (antigen). Subsequently, the detection target substance labeled with the labeling substance is irradiated with excitation light, and fluorescent light emitted from the fluorescent substance is detected. The amount of detection target substance is determined from the intensity of the detected fluorescent light or the like. Among such FIAs, a surface plasmon-field enhanced fluorescence spectroscopy (hereinafter also called "SPFS") has been known as a method capable of detecting a detection target substance specifically, highly sensitively.

The SPFS fixes, onto a metal film, first capturing bodies (e.g., primary antibodies) that can be specifically bonded to the detection target substance, thus forming a reaction field for capturing the detection target substance. Typically, the reaction field is formed in a micro flow path. Liquid (specimen) containing the detection target substance is injected into the flow path, thereby bonding the detection target substance to the first capturing bodies. Next, second capturing bodies (e.g., secondary antibodies) labeled with a fluorescent substance are injected into the flow path, thereby further bonding the second capturing bodies to the detection target substance bonded to the primary antibodies. That is, the detection target substance is indirectly labeled with the fluorescent substance. In this state, irradiation of the metal film with excitation light excites the fluorescent substance with localized-field light enhanced by surface plasmon resonance (hereinafter also called "SPR") to emit fluorescent light. Detection of the fluorescent light emitted from the fluorescent substance can in turn detect the detection target substance.

In this case, when a specimen containing a significantly small amount of the detection target substance is used, the contact opportunity between the detection target substance and the first capturing bodies can be increased by feeding the specimen in the flow path in a reciprocating manner. Consequently, a sufficient amount of the detection target substance can be bonded to the first capturing bodies. Preferably, washing liquid for washing the flow path, and the second capturing bodies are fed in a reciprocating manner likewise. However, as illustrated in FIG. 1A, possible occurrence of bubble 64 in flow path 44 covers first capturing bodies 60 with bubble 64, which sometimes prevents detection target substance 61 from being bonded to first capturing bodies 60 covered with bubble 64. Likewise, as illustrated in FIG. 1B, possible occurrence of bubble 64 in flow path 44 sometimes prevents second capturing bodies 62 from being bonded to detection target substance 61 covered with bubble 64. Possible presence of bubble 64 in flow path 44 during fluorescent light detection prevents the fluorescent light from being appropriately detected owing to the adverse effect of refraction.

In order to prevent such a bubble from occurring, adjustment of timing of liquid injection and suction during feeding of the liquid, such as the specimen, washing liquid and second antibodies, in the flow path in a reciprocating manner has been proposed (for example, see PTL 1).

CITATION LIST

Patent Literature

PTL 1
WO2011/027851

SUMMARY OF INVENTION

Technical Problem

According to the invention described in PTL 1, as illustrated in FIG. 2A, liquid 63 is injected into flow path 44 and liquid 63 is sucked from flow path 44 using a pipette (pipette chip) fixed at a predetermined position. When liquid 63 in flow path 44 is removed using pipette chip 134 fixed at the predetermined position as described above, a slight amount of liquid 63 remains adjacent to the end of flow path 44 closer to pipette chip 134, as illustrated in FIG. 2B. In this state, pipette chip 134 having sucked liquid 63 therein is taken out, and pipette chip 134 retaining new liquid 63' is inserted to a predetermined position, which pushes residual liquid 63 into flow path 44 as illustrated in FIG. 2C. When new liquid 63' is injected from pipette chip 134 into flow path 44 as it is, bubble 64 occurs between liquid 63 remaining in flow path 44 and newly injected liquid 63', as illustrated in FIG. 2D. As described above, according to the presence of bubble 64 in flow path 44, there is a possibility that the reaction cannot appropriately be performed in flow path 44, and a possibility that the fluorescent light cannot appropriately be detected (see FIGS. 12 and 13).

As described above, the invention described in PTL 1 can prevent a bubble from occurring during reciprocating feeding of liquid in the flow path. However, the invention described in PTL 1 has points to be improved in view of preventing a bubble from occurring when the liquid in the flow path is replaced.

An object of the present invention is to provide a liquid feeding method that can remove liquid in a flow path and introduce liquid into the flow path without causing a bubble in the flow path, and a detection system and a detection apparatus that achieve the removing and introducing.

Solution to Problem

A liquid feeding method according to an embodiment of the present invention includes: a first step of sucking, by a pipette chip, liquid in a liquid injection section to remove liquid in a flow path in a state where no gap is between an opening section and the pipette chip, the pipette chip being inserted through the opening section into the liquid injection section of a detection chip, the detection chip including both the flow path and the liquid injection section communicating with one end of the flow path and having the opening section; a second step of, after the first step, moving the pipette chip in a reciprocating manner two or more times along an axial direction of the pipette chip while ensuring that no gap occurs between the opening section and the pipette chip, the two or more times including at least one time where fluid in the liquid injection section is sucked by the pipette chip; and a third step of, after the second step, injecting the liquid from the pipette chip into the liquid injection section to introduce the liquid into the flow path in a state where no gap is between the opening section and the pipette chip.

A detection system according to an embodiment of the present invention includes: a detection chip including both a flow path and a liquid injection section communicating with one end of the flow path and having an opening section; a pipette configured to inject liquid into the liquid injection section and suck the liquid from the liquid injection section, with a pipette chip being mounted on a distal end of the pipet; and a pipette controller configured to control the pipette, in which when the liquid is introduced into the flow path, the pipette controller causes the pipette to inject the liquid into the liquid injection section in a state where the pipette chip is inserted through the opening section into the liquid injection section while ensuring that no gap occurs between the opening section and the pipette chip, and when the liquid is removed from the flow path, the pipette controller causes the pipette to suck the liquid in the liquid injection section in a state where the pipette chip is inserted through the opening section into the liquid injection section while ensuring that no gap occurs between the opening section and the pipette chip, and subsequently the pipette moves the pipette chip along an axial direction of the pipette chip in a reciprocating manner two or more times while ensuring that no gap occurs between the opening section and the pipette chip, the two or more times including at least one time where fluid in the liquid injection section is sucked.

A detection apparatus according to an embodiment of the present invention includes: a chip holder configured to hold a detection chip including both a flow path and a liquid injection section communicating with one end of the flow path and having an opening section; a pipette capable of being provided with a pipette chip mounted on a distal end of the pipette, the pipette being configured to inject liquid into the liquid injection section of the detection chip held by the chip holder, and suck the liquid from the liquid injection section; and a pipette controller configured to control the pipette, in which when the liquid is introduced into the flow path, the pipette controller causes the pipette to inject the liquid into the liquid injection section in a state where the pipette chip is inserted through the opening section into the liquid injection section while ensuring that no gap occurs between the opening section and the pipette chip, and when the liquid is removed from the flow path, the pipette controller causes the pipette to suck the liquid in the liquid injection section in a state where the pipette chip is inserted through the opening section into the liquid injection section while ensuring that no gap occurs between the opening section and the pipette chip, and subsequently the pipette moves the pipette chip along an axial direction of the pipette chip in a reciprocating manner two or more times while ensuring that no gap occurs between the opening section and the pipette chip, the two or more times including at least one time where fluid in the liquid injection section is sucked.

Advantageous Effects of Invention

The present invention can remove the liquid in the flow path and introduce the liquid into the flow path without causing a bubble in the flow path.

DESCRIPTION OF EMBODIMENTS

Hereinafter, embodiments of the present invention are described in detail with reference to the accompanying drawings. In the following description, an SPFS apparatus that can execute a liquid feeding method according to one embodiment of the present invention is described as a typical example of the detection apparatus and the detection system according to the present invention. However, the detection apparatus and the detection system according to the present invention are not limited thereto. In the following description, the SPFS apparatus in a state where no detection chip and no pipette chip are mounted corresponds to the detection apparatus according to one embodiment of the present invention. The SPFS apparatus in a state where a detection chip and a pipette chip are mounted corresponds to the detection system according to one embodiment of the present invention.

Figure 3:
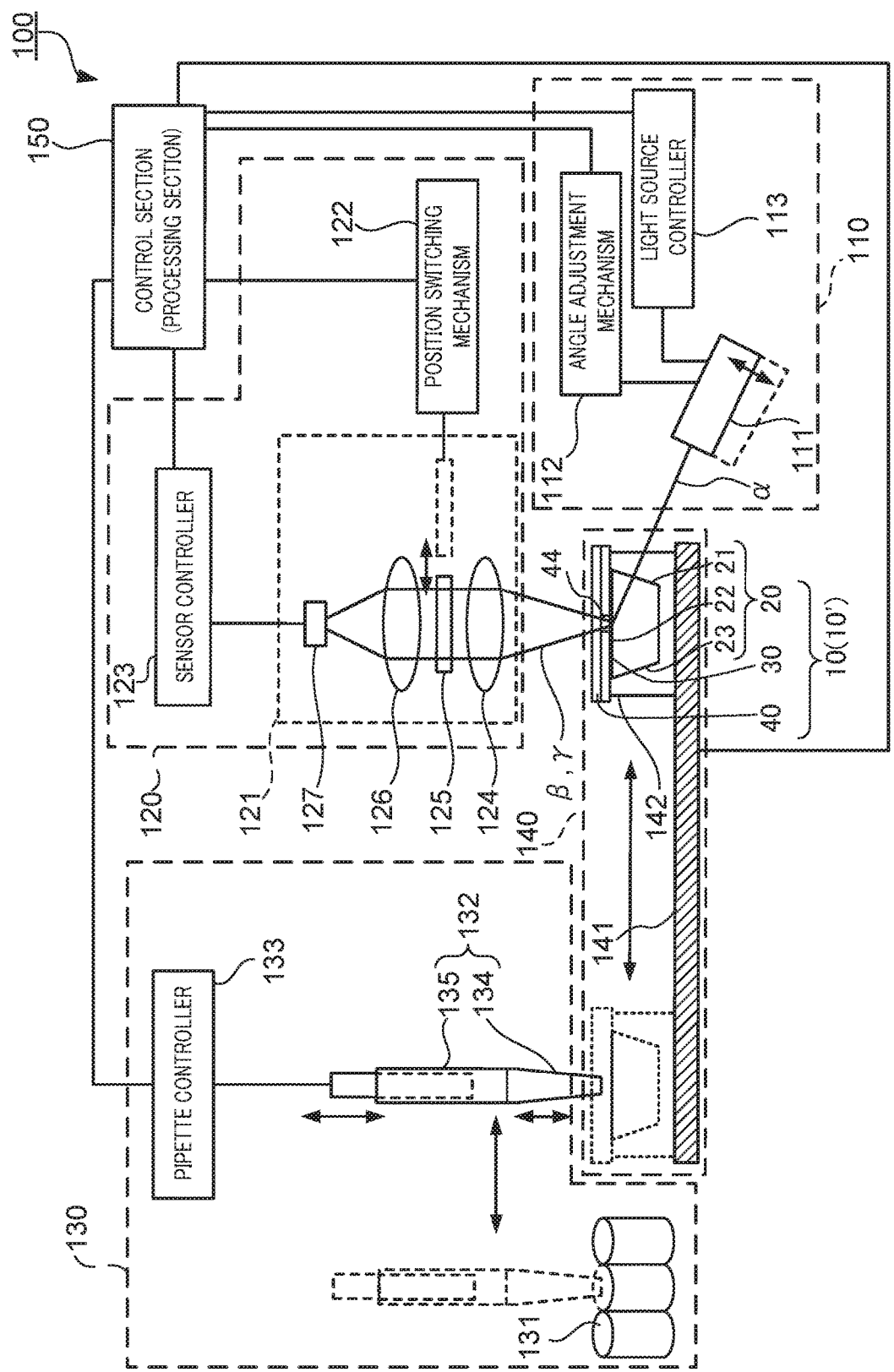
FIG. 3 schematically illustrates a configuration of a detection apparatus (SPFS apparatus) according to one embodiment of the present invention.

FIG. 3 schematically illustrate a configuration of SPFS apparatus 100 according to one embodiment of the present invention. As illustrated in FIG. 3, SPFS apparatus 100 includes an excitation light irradiation unit 110, fluorescent light detection unit 120, liquid feeding unit 130, conveyance unit 140, and control section 150. In a state where detection chip 10 is mounted on chip holder 142 of conveyance unit 140, SPFS apparatus 100 irradiates metal film 30 of detection chip 10 with excitation light α so as to cause surface plasmon resonance, and cause localized-field light based on the surface plasmon resonance. The fluorescent substance residing on metal film 30 is excited with the localized-field light, and fluorescent light β emitted from the fluorescent substance is detected, thereby measuring the presence or absence and the amount of a detection target substance in a specimen. In this embodiment, detection chip 10 is detachably mounted on the chip holder of the detection apparatus.

Hereinafter, first, detection chip 10 and SPFS apparatus 100 (the detection system and the detection apparatus) are described, and subsequently a method of feeding various types of liquid to detection chip 10 (liquid feeding method) and a method of detecting a detection target substance using SPFS apparatus 100 are described.

(Detection Chip)

As illustrated in FIG. 3, detection chip 10 includes: prism 20 that includes light incident surface 21, film-formed surface 22 and light emission surface 23; metal film 30 formed on film-formed surface 22 of prism 20; and flow path cover 40 disposed on film-formed surface 22 of prism 20 or metal film 30. As described below, detection chip 10 further includes: liquid injection section 45; flow path 44; reservoir section 46 that communicates with one end of flow path 44; and reservoir section 46 that communicates with the other end of flow path 44. In this embodiment, flow path cover 40 adheres to metal film 30 (or prism 20) with adhesive layer 50, such as double-faced adhesive tape. Adhesive layer 50 also has a role of defining the side shape of flow path 44. Flow path cover 40 may be joined to metal film 30 (or prism 20) of detection chip 10 by laser welding, ultrasonic welding, pressure bonding using a clamp member or the like without using adhesive layer 50. In this case, the side shape of flow path 44 is defined by flow path cover 40.

Prism 20 is made of a dielectric material that is transparent for excitation light α, and includes light incident surface 21, film-formed surface 22, and light emission surface 23, as illustrated in FIG. 3. Light incident surface 21 is a surface for allowing the excitation light α from excitation light irradiation unit 110 to enter the inside of prism 20. Metal film 30 is disposed on film-formed surface 22. Excitation light α having entered the inside of prism 20 is reflected by the rear surface of metal film 30, more specifically, the interface (film-formed surface 22) between prism 20 and metal film 30. Meanwhile, light emission surface 23 is a surface for emitting the reflected light reflected by film-formed surface 22 to the outside of prism 20.

The shape of prism 20 is not specifically limited. In this embodiment, the shape of prism 20 is a prismatic body whose base surface is a trapezoid. A surface corresponding to one base of the trapezoid is film-formed surface 22, a surface corresponding to one leg is light incident surface 21, and a surface corresponding to the other leg is light emission surface 23. Preferably, the trapezoid serving as the base surface is an isosceles trapezoid. Accordingly, light incident surface 21 and light emission surface 23 are symmetrical, and the s-polarized component of excitation light α becomes less likely to stay in prism 20.

Light incident surface 21 is formed such that excitation light α cannot return to excitation light irradiation unit 110. In a case where the light source of excitation light α is a laser diode (hereinafter also called "LD"), if light α returns to LD, the excited state is disturbed, and the wavelength and output of excitation light α vary. In a scan range centered on an ideal resonance angle or enhancement angle, light incident surface 21 is set to have an angle of preventing excitation light α from perpendicularly entering light incident surface 21. Here, the "resonance angle" means an incident angle with the light intensity of the reflected light emitted from light emission surface 23 being the minimum when the incident angle of excitation light α on metal film 30 is swept. The "enhancement angle" means an incident angle with the light intensity of scattered light (hereinafter called "plasmon scattered light") γ being the maximum when the incident angle of excitation light α on metal film 30 is swept; the plasmon scattered light has the same wavelength as excitation light α and is emitted above detection chip 10. In this embodiment, the angle between light incident surface 21 and film-formed surface 22, and the angle between film-formed surface 22 and light emission surface 23 are each about 80°.

The design of detection chip 10 roughly determines the resonance angle (and the enhancement angle significantly adjacent thereto). Design elements include the refraction index of prism 20, the refraction index of metal film 30, the film thickness of metal film 30, the extinction coefficient of metal film 30, the wavelength of excitation light α and the like. The resonance angle and enhancement angle are shifted by the detection target substance captured on metal film 30 via the first capturing bodies. The shifted amount is less than several degrees.

Prism 20 has a certain amount of birefringent property. Examples of the material of prism 20 include resin and glass. Preferably, the material of prism 20 is a resin that has a refraction index ranging from 1.4 to 1.6 and a small amount of birefringent property.

Metal film 30 is disposed on film-formed surface 22 of prism 20. Accordingly, an interaction (SPR) occurs between photons of excitation light α entering film-formed surface 22 with a total reflection condition and free electrons in metal film 30, and localized-field light (typically, "evanescent light" or "near-field light") occurs on the surface of metal film 30.

The material of metal film 30 is not specifically limited. Any metal may be adopted only if the metal can cause the surface plasmon resonance. Examples of the material of metal film 30 include gold, silver, copper, aluminum, and alloys of these metals. A method of forming metal film 30 is not specifically limited. Examples of the method of forming metal film 30 include sputtering, and vapor deposition, and plating. The thickness of metal film 30 is not specifically limited. It is however preferable that the thickness be in a range from 30 to 70 nm.

Figure 4:
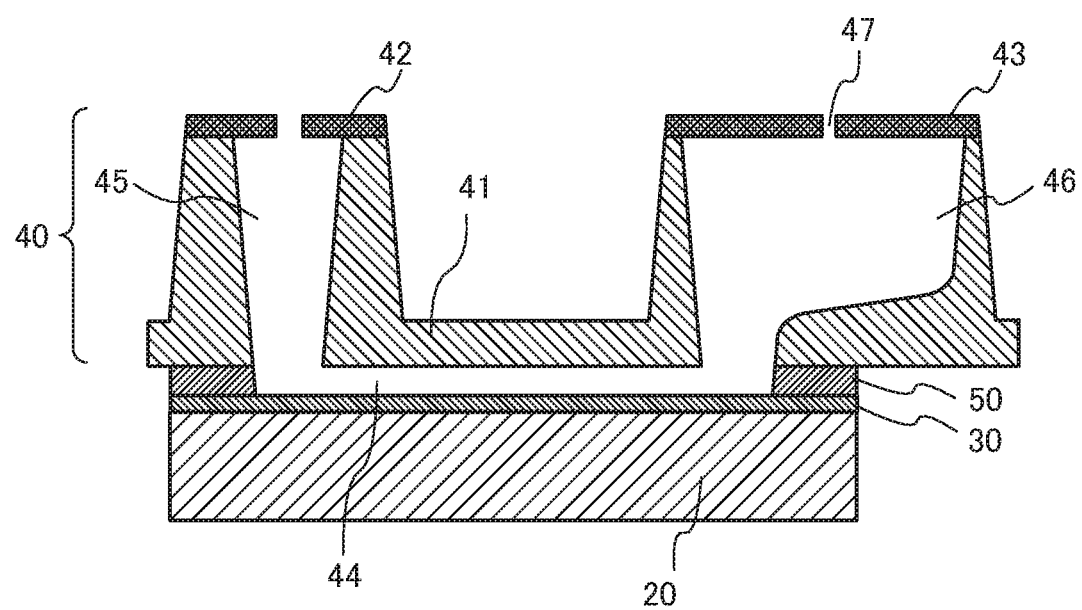
FIG. 4 is a sectional view of a detection chip.

FIG. 4 is a sectional view of detection chip 10 viewed in a direction different from that in FIG. 3. As illustrated in FIG. 4, flow path cover 40 includes frame 41, liquid injection section cover film 42, and reservoir section cover film 43. Two through-holes are formed in frame 41. One opening section of one through-hole is blocked with metal film 30 (or prism 20), and the other opening is blocked with liquid injection section cover film 42, thereby allowing the through-hole to function as liquid injection section 45. One opening section of the other through-hole is blocked with metal film 30 (or prism 20), and the other opening is blocked with reservoir section cover film 43, thereby allowing the through-hole to function as reservoir section 46. Reservoir section cover film 43 is provided with ventilation hole 47.

As described above, in this embodiment, flow path cover 40 (frame 41) adheres to metal film 30 (or prism 20) with adhesive layer 50, such as double-faced adhesive tape. Adhesive layer 50 also has a role of defining the side shape of flow path 44. That is, adhesive layer 50 is provided with a narrowly shaped through-hole. The one opening section of the through-hole is blocked with metal film 30 (or prism 20), and the other opening section is blocked with frame 41. Accordingly, flow path 44 is formed where the one end is open to liquid injection section 45 and the other end is open to reservoir section 46. In the case where flow path cover 40 is joined to metal film 30 (or prism 20) without using adhesive layer 50, a groove is formed on a surface of frame 41 that is closer to metal film 30 and defines the shape of flow path 44. In this case, the opening section of the groove is blocked with metal film 30 (or prism 20), thereby forming flow path 44 whose one end is open to liquid injection section 45 and whose other end is open to reservoir section 46.

Frame 41 is formed of a material that is transparent for light (e.g., fluorescent light β and plasmon scattered light γ). Note that a part of frame 41 may be formed of a material that is non-transparent for the light only if the material does not prevent the light from being taken by a detection method described later. Examples of the material transparent for the light include resins.

Liquid injection section cover film 42 is a film that allows pipette chip 134 to be inserted, and when pipette chip 134 is inserted, the film can be in close contact with the outer periphery of pipette chip 134 without any gap. For example, liquid injection section cover film 42 is a two-layer film made up of a flexible film and an adhesive film. Liquid injection section cover film 42 may be provided with a micro through-hole for allowing pipette chip 134 to be inserted thereinto. In this embodiment, liquid injection section cover film 42 is provided with a through-hole having an external diameter of 1.2 mm.

Any type of the flexible film may be adopted only if the film can be in close contact with the outer periphery of pipette chip 134 after insertion of pipette chip 134. For example, the flexible film is a polyurethane film that has a tensile elastic modulus ranging from 0.05 to 2 GPa, a tensile rupture elongation ranging from 200 to 2000%, and a tear strength ranging 80 to 3000 mN. Other examples of the flexible film include low-density polyethylene (LDPE), linear low-density polyethylene (LLDPE), medium-density polyethylene (MDPE), nylon, non-oriented polypropylene (CPP), ethylene-vinylalcohol copolymer (EVOH), silicone, polyvinyl alcohol (PVA), polyvinyl chloride (PVC) and the like. The thickness of the flexible film is not specifically limited, and is about 100 μm, for example. The type of the adhesive film is not specifically limited only if this film can fix the flexible film and frame 41.

As described above, reservoir section cover film 43 has ventilation hole 47. The configuration of reservoir section cover film 43 is not specifically limited. For example, reservoir section cover film 43 may be a two-layer film similar to liquid injection section cover film 42 described above.

The first capturing bodies are fixed onto metal film 30 exposed in flow path 44. The first capturing body is a substance that has a recognition site to be specifically bonded to the detection target substance in the specimen. In the case where the first capturing bodies are fixed in flow path 44, the detection target substance is selectively bonded to the first capturing bodies when the specimen is fed into flow path 44. That is, the detection target substance is captured in flow path 44. Accordingly, the detection target substance can be detected as described later. The type of the first capturing body is not specifically limited only if the body has a recognition site for specifically bonded to the detection target substance. Examples of the first capturing bodies include antibodies (primary antibodies) or their fragments that can be specifically bonded to the detection target substance, enzymes that can specifically bonded to the detection target substance and the like. The width and height of flow path 44 are not specifically limited, and are appropriately selected in conformity with the usage of detection chip 10.

As shown in FIG. 6A to 6D, pipette chip 134 is inserted into liquid injection section 45. Here, the opening section (the through-hole provided in liquid injection section cover film 42) of liquid injection section 45 is in contact with the outer periphery of pipette chip 134 without any gap. Accordingly, by injecting the liquid from pipette chip 134 into liquid injection section 45, the liquid can be introduced into flow path 44. By sucking the liquid residing in liquid injection section 45 into pipette chip 134, the liquid in flow path 44 can be removed. By alternately injecting and sucking the liquid, the liquid can be fed in flow path 44 in a reciprocating manner. The shape and volume of liquid injection section 45 are appropriately selected in conformity with the shape and the like of pipette chip 134.

When an amount of liquid exceeding the volume of flow path 44 is introduced from liquid injection section 45 into flow path 44, the liquid flows from flow path 44 into reservoir section 46. Also when the liquid is fed in flow path 44 in a reciprocating manner, the liquid flows into reservoir section 46. The liquid flowed into reservoir section 46 is stirred in reservoir section 46. When the liquid is stirred in reservoir section 46, the concentrations of components (e.g., the detection target substance, cleaning components, etc.) of the liquid (the specimen and washing liquid) passing through flow path 44 becomes uniform, and various reactions are facilitated in flow path 44, and the washing effect is improved. The shape and volume of reservoir section 46 are not specifically limited only if the liquid can be sufficiently retained during reciprocating liquid feeding.

Typically, detection chip 10 is replaced at every measurement. Preferably, detection chip 10 is a structural body with sides each having a length ranging from several millimeters to several centimeters. Alternatively, this chip may be a smaller structural body or a larger structural body that are not classified into "chip".

(SPFS Apparatus)

Next, the configuration elements of SPFS apparatus 100 other than the detection chip are described. As described above, SPFS apparatus 100 includes excitation light irradiation unit 110, fluorescent light detection unit 120, liquid feeding unit 130, conveyance unit 140, and control section 150.

Excitation light irradiation unit 110 irradiates detection chip 10 held by chip holder 142 with excitation light α. During measurement of fluorescent light β or plasmon scattered light γ, excitation light irradiation unit 110 emits only the p-polarized wave for metal film 30 toward light incident surface 21 such that the incident angle to metal film 30 can be an angle for causing SPR. Here, "excitation light" is light that directly or indirectly excites the fluorescent substance. For example, excitation light α is light that causes localized-field light for exciting the fluorescent substance, on the surface of metal film 30, when being emitted through prism 20 at an angle causing SPR on metal film 30. Excitation light irradiation unit 110 includes light source unit 111, angle adjustment mechanism 112, and light source controller 113.

Light source unit 111 emits collimated excitation light α having a constant wavelength and light intensity such that an irradiation spot on the rear surface of metal film 30 can have a substantially circular shape. Light source unit 111 includes, for example, a light source of excitation light α, a beam shaping optical system, an APC mechanism, and a temperature adjustment mechanism, each of which is not illustrated.

The type of the light source is not specifically limited, and is a laser diode (LD), for example. Other examples of the light source include a light-emitting diode, a mercury lamp, and other laser light sources. In a case where the light emitted from the light source is not a beam, the light emitted from the light source is transformed into a beam by lenses, mirrors, a slit and the like. In a case where the light emitted from the light source is not monochromatic light, the light emitted from the light source is transformed into monochromatic light by a diffraction grating and the like. In a case where the light emitted from the light source is not linearly polarized light, the light emitted from the light source is transformed into linearly polarized light by a polarizer and the like.

The beam shaping optical system includes, for example, a collimator, a band-pass filter, a linearly polarizing filter, a half-wave plate, a slit, a zoom section and the like. The beam shaping optical system may include all or some of these components. The collimator collimates excitation light α emitted from the light source. The band-pass filter transforms excitation light α emitted from the light source into narrow-band light only having a center wavelength. This is because excitation light α from the light source has a slight wavelength distribution width. The linearly polarizing filter transforms excitation light α emitted from the light source into completely linearly polarized light. The half-wave plate adjusts the polarization direction of excitation light α such that the p-polarized component can enter metal film 30. The slit and the zoom section adjusts the beam width and the contour shape of the excitation light α such that the shape of the irradiation spot on the rear surface of metal film 30 can be a circle having a predetermined size.

The APC mechanism controls the light source so as to have a constant output. More specifically, the APC mechanism detects the intensity of the light branched off from excitation light α using a photodiode or the like, not illustrated. The APC mechanism controls the light source to have a constant output by controlling the input energy through a recurrent circuit.

The temperature adjustment mechanism may be, for example, a heater, Peltier element or the like. The wavelength and energy of the emitted light from the light source sometimes vary according to the temperature. Consequently, the wavelength and energy of the emitted light from the light source are controlled to be constant by maintaining the temperature of the light source constant by the temperature adjustment mechanism.

Angle adjustment mechanism 112 adjusts the incident angle of excitation light α to metal film 30 (the interface (film-formed surface 22) between prism 20 and metal film 30). Angle adjustment mechanism 112 relatively rotates the optical axis of excitation light α and chip holder 142 in order to emit excitation light α at a predetermined incident angle through prism 20 toward a predetermined position on metal film 30.

For example, angle adjustment mechanism 112 rotates light source unit 111 centered on the axis (the axis perpendicular to the sheet of FIG. 3) orthogonal to the optical axis of excitation light α. Here, the position of the rotation axis is set such that the position of the irradiation spot can be almost unchanged on metal film 30 even when the incident angle is swept. The position of the rotation center is set adjacent to the intersection of the two optical axes of excitation light α at the opposite ends of the scan range of the incident angle (between the irradiation position on film-formed surface 22 and light incident surface 21), thereby allowing the deviation of the irradiation position to be the minimum.

As described above, the incident angle of excitation light α to metal film 30 that allows the light intensity of plasmon scattered light γ to be the maximum is the enhancement angle. The incident angle of excitation light α is set to the enhancement angle or its adjacent angle, thereby allowing fluorescent light β having a high intensity to be measured. The basic incident condition of excitation light α is determined by the material and shape of prism 20 of detection chip 10, the film thickness of metal film 30, the refraction index of liquid in flow path 44 and the like. The optimal incident condition is slightly changed by the type and amount of the fluorescent substance in flow path 44, the shape error of prism 20 and the like. Accordingly, it is preferable to obtain the optimal enhancement angle for each measurement.

Light source controller 113 controls the emission of excitation light α from light source unit 111 by controlling various devices included in light source unit 111. Light source controller 113 is made up of a publicly known computer or microcomputer that includes, an operation device, a control device, a storage device, an input device, and an output device, for example.

Fluorescent light detection unit 120 detects fluorescent light β caused by irradiating metal film 30 with excitation light α. If necessary, fluorescent light detection unit 120 also detects plasmon scattered light γ caused by irradiating metal film 30 with excitation light α. Fluorescent light detection unit 120 includes light receiving unit 121, position switching mechanism 122, and sensor controller 123.

Light receiving unit 121 is disposed in the direction of the normal of metal film 30 of detection chip 10. Light receiving unit 121 includes first lens 124, optical filter 125, second lens 126, and light receiving sensor 127.

First lens 124 is, for example, a condenser lens, and condenses the light emitted from metal film 30. Second lens 126 is, for example, an imaging lens, and forms an image of the light condensed by first lens 124, on the light receiving surface of light receiving sensor 127. The optical path between the lenses is a substantially parallel optical path. Optical filter 125 is disposed between the lenses.

Optical filter 125 guides only the fluorescent light component to light receiving sensor 127, and removes the excitation light component (plasmon scattered light γ) in order to detect fluorescent light β at a high S (signal)/N (noise). Examples of optical filter 125 include an excitation light reflecting filter, a short-wavelength cut filter, and a band-pass filter. Optical filter 125 is, for example, a filter that includes a multi-layer film for reflecting a predetermined optical component, or a color glass filter that absorbs a predetermined optical component.

Light receiving sensor 127 detects fluorescent light β and plasmon scattered light γ. Light receiving sensor 127 has a high sensitivity that allows faint fluorescent light β from a significantly small amount of the detection target substance to be detected. Light receiving sensor 127 is, for example, a photomultiplier tube (PMT) or an avalanche photodiode (APD) or the like.

Position switching mechanism 122 switches the position of optical filter 125 to the optical path in light receiving unit 121 or the outside of the optical path. More specifically, when light receiving sensor 127 detects fluorescent light β, optical filter 125 is disposed on the optical path of light receiving unit 121. When light receiving sensor 127 detects plasmon scattered light γ, optical filter 125 is disposed outside of the optical path of optical filter 125.

Sensor controller 123 controls to detect the output value of light receiving sensor 127, manage the sensitivity of light receiving sensor 127 according to the detected output value, and change the sensitivity of light receiving sensor 127 for obtaining an appropriate output value. Sensor controller 123 is made up of a publicly known computer or microcomputer that includes, an operation device, a control device, a storage device, an input device, and an output device, for example.

Liquid feeding unit 130 injects various types of liquid into liquid injection section 45 of detection chip 10 held by chip holder 142, and guides the liquid into flow path 44. Liquid feeding unit 130 sucks various types of liquid from liquid injection section 45 of detection chip 10 held by chip holder 142, and removes the liquid in flow path 44. Liquid feeding unit 130 alternately repeats liquid injection into liquid injection section 45 and liquid sucking from liquid injection section 45, thereby feeding the liquid in flow path 44 in a reciprocating manner. In this embodiment, liquid feeding unit 130 injects and sucks, for example, the specimen, washing liquid, label liquid including the second capturing bodies labeled with the fluorescent substance (hereinafter called "label liquid") and the like. Liquid feeding unit 130 includes liquid chip 131, pipette 132, and pipette controller 133.

Liquid chip 131 includes vessels for retaining liquid, such as the specimen, washing liquid, and label liquid, respectively. Typically, liquid chip 131 may be multiple vessels arranged according to the types of liquid, or a chip where vessels are integrated.

Pipette 132 includes pipette chip 134, and syringe pump 135. Reciprocating movement of a plunger in the syringe pump quantitatively sucks and discharges the liquid in pipette chip 134 attached to the distal end of syringe pump 135 (pipette 132). If pipette chip 134 is replaceable, the need to wash pipette chip 134 is negated. Accordingly, the negation is preferable in view of preventing impurities from being mixed. If pipette chip 134 is not configured to be replaceable, pipette chip 134 can be used without replacement by adding the configuration of washing the inside of pipette chip 134. In this case, pipette chip 134 and syringe pump 135 may be fixed or integrated.

In this embodiment, when pipette chip 134 is inserted into liquid injection section 45 of detection chip 10, the opening section of liquid injection section 45 (the through-hole provided in liquid injection section cover film 42) and the outer periphery of pipette chip 134 are required to be in contact with each other without any gap. It is preferable that a region of pipette chip 134 in contact with liquid injection section cover film 42 of detection chip 10 have a constant external diameter, and it is preferable that the region have a cylindrical shape. A region that is not in contact with liquid injection section cover film 42 does not necessarily have a constant external diameter, and may have any shape. As illustrated in FIG. 6C, if even with movement of pipette chip 134 by about several hundred micrometers in the vertical direction (axial direction of pipette chip 134), no gap occurs between the opening section of liquid injection section 45 (the through-hole provided in liquid injection section cover film 42) and the outer periphery of pipette chip 134, the external shape of pipette chip 134 is not specifically limited and may be a truncated cone, for example.

Pipette controller 133 includes drive device for syringe pump 135, and a movement device for pipette 132. The drive device for syringe pump 135 is a device for moving the plunger of syringe pump 135 in a reciprocating manner, and includes a stepper motor, for example. The drive that includes the stepper motor can manage the liquid feeding amount and the liquid feeding rate of pipette 132. Consequently, this is preferable in view of management of the remaining liquid amount in detection chip 10. The movement device of pipette 132 freely moves pipette 132 in two directions that are the axial direction of pipette chip 134 (e.g., the vertical direction), and the direction traversing the axial direction (e.g., the horizontal direction), for example. Movement device of pipette 132 includes, for example, a robot arm, a two-axis stage, or a freely vertically movable turntable.

Pipette controller 133 drives syringe pump 135 to suck various types of liquid from liquid chip 131 into pipette chip 134. Pipette controller 133 then moves pipette 132 to insert pipette chip 134 through the opening section (the through-hole provided in liquid injection section cover film 42) into liquid injection section 45 of detection chip 10, and drives syringe pump 135 to inject the liquid residing in pipette chip 134 into liquid injection section 45. After supplying the liquid, pipette controller 133 drives syringe pump 135 to suck the liquid residing in liquid injection section 45 into pipette chip 134. Pipette controller 133 drives syringe pump 135 to repeat liquid injection and liquid sucking alternately to feed the liquid in flow path 44 in a reciprocating manner. Such liquid feeding in the reciprocating manner washes the inside of flow path 44, reacts the first capturing bodies and the detection target substance in flow path 44, and reacts the detection target substance and the second capturing bodies labeled with the fluorescent substance. In a case where the liquid in flow path 44 is removed, pipette controller 133 sucks the liquid residing in liquid injection section 45 into pipette chip 134, subsequently moves pipette 132, and moves pipette chip 134 along the axial direction in the manner reciprocating two or more times, as described later. Such a configuration can prevent bubbles in flow path 44 from occurring.

Conveyance unit 140 conveys detection chip 10 to a measurement position or a liquid feeding position, and fixes this chip thereto. Here, the "measurement position" is a position where excitation light irradiation unit 110 irradiates detection chip 10 with excitation light α, and fluorescent light detection unit 120 detects fluorescent light β or plasmon scattered light γ caused by the irradiation. The "liquid feeding position" is a position where liquid feeding unit 130 injects the liquid into liquid injection section 45 of detection chip 10 or sucks the liquid residing in flow path 44 of detection chip 10 from liquid injection section 45. Conveyance unit 140 includes conveyance stage 141, and chip holder 142. Chip holder 142 is fixed to conveyance stage 141, and detachably holds detection chip 10. The shape of chip holder 142 is a shape that can hold detection chip 10 and does not interfere with the optical paths of excitation light α, fluorescent light β and plasmon scattered light γ. For example, chip holder 142 is provided with an opening for allowing excitation light α, fluorescent light β and plasmon scattered light γ to pass therethrough. Conveyance stage 141 moves chip holder 142 in one direction and the reverse direction. Conveyance stage 141 also has a shape that does not interfere with the optical paths of excitation light α, fluorescent light β and plasmon scattered light γ. Conveyance stage 141 is driven by a stepper motor or the like, for example.

Control section 150 controls angle adjustment mechanism 112, light source controller 113, position switching mechanism 122, sensor controller 123, pipette controller 133, and conveyance stage 141. Control section 150 is made up of a publicly known computer or microcomputer that includes, an operation device, a control device, a storage device, an input device, and an output device, for example.

(Liquid Feeding Method)

Next, a method of feeding various types of liquid in flow path 44 of detection chip 10 is described. For the sake of convenience of description, the description is started in a state where liquid 63 has been injected in flow path 44, and liquid 63 is fed in flow path 44 in a reciprocating manner.

Figure 5:
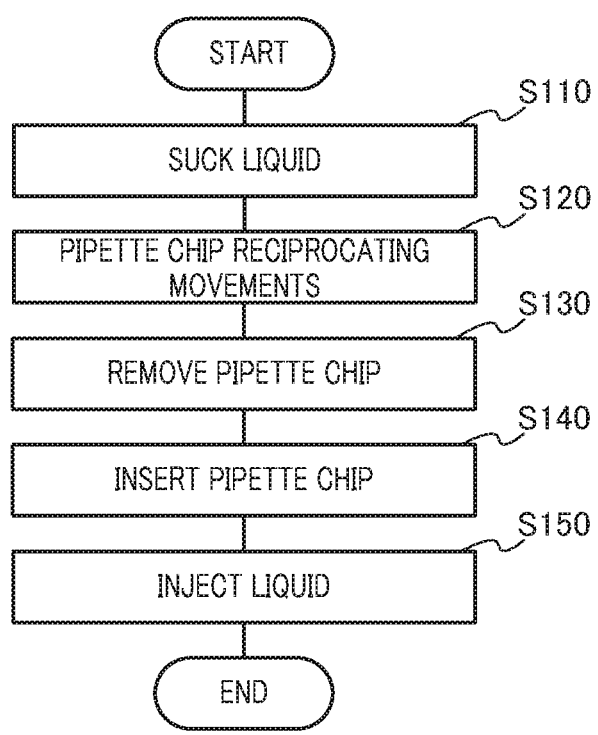
FIG. 5 is a flowchart of a liquid feeding method according to one embodiment of the present invention.

FIG. 5 is a flowchart of the liquid feeding method according to this embodiment. FIG. 6A to 6D schematically illustrate the liquid feeding method according to this embodiment. In each of FIG. 6A to 6D, an upper diagram illustrates a partially enlarged longitudinal sectional view of detection chip 10 in proximity to liquid injection section 45, and a lower diagram illustrates a partially enlarged cross-sectional view of liquid injection section 45 in proximity to a bottom part of liquid injection section 45.

Figure 6A:
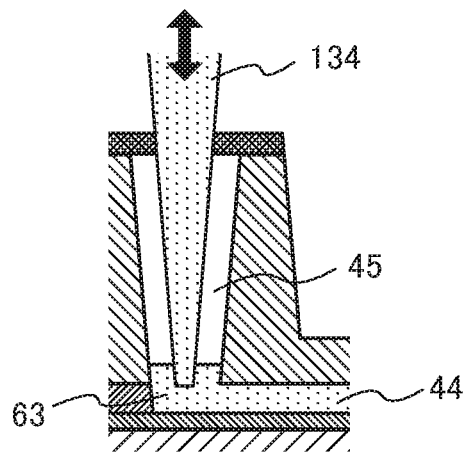
FIGS. 6A to 6D schematically illustrate a liquid feeding method according to one embodiment of the present invention.
Figure 6A:
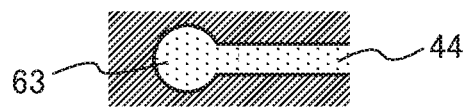

As illustrated in FIG. 6A, in a state of reciprocating liquid feeding in flow path 44, pipette chip 134 is inserted through the opening section (the through-hole provided in liquid injection section cover film 42) into liquid injection section 45 so as to prevent a gap from occurring between liquid injection section cover film 42 and pipette chip 134. In this state, pipette chip 134 alternately repeats sucking of liquid 63 in liquid injection section 45, and injection of liquid 63 into liquid injection section 45, thereby feeding liquid 63 in flow path 44 in a reciprocating manner. Here, reservoir section cover film 43 is provided with ventilation hole 47. Consequently, when liquid 63 is injected into liquid injection section 45, liquid 63 travels in flow path 44 and reaches the inside of reservoir section 46, without excessively increasing the pressures in liquid injection section 45, flow path 44 and reservoir section 46. When liquid 63 in liquid injection section 45 is sucked, liquid 63 in reservoir section 46 travels in flow path 44 and reaches the inside of liquid injection section 45, without excessively reducing the pressures of liquid injection section 45, flow path 44 and reservoir section 46.

Figure 1A:
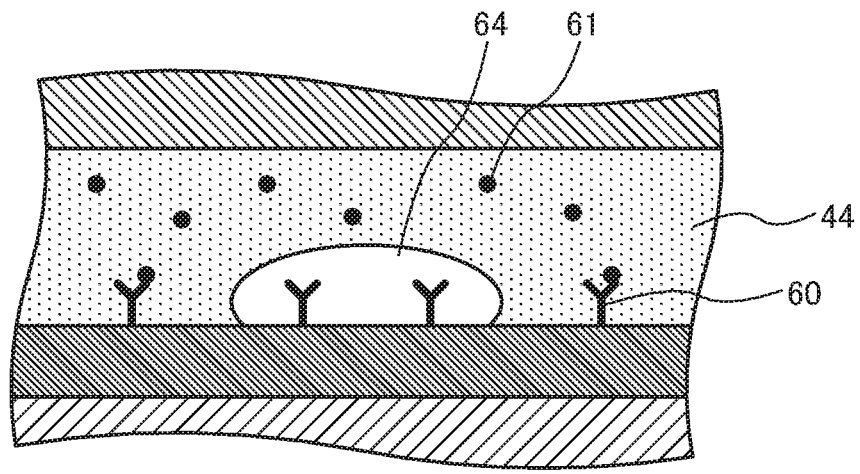
FIGS. 1A and 1B schematically illustrate adverse effects of a bubble.
Figure 1B:
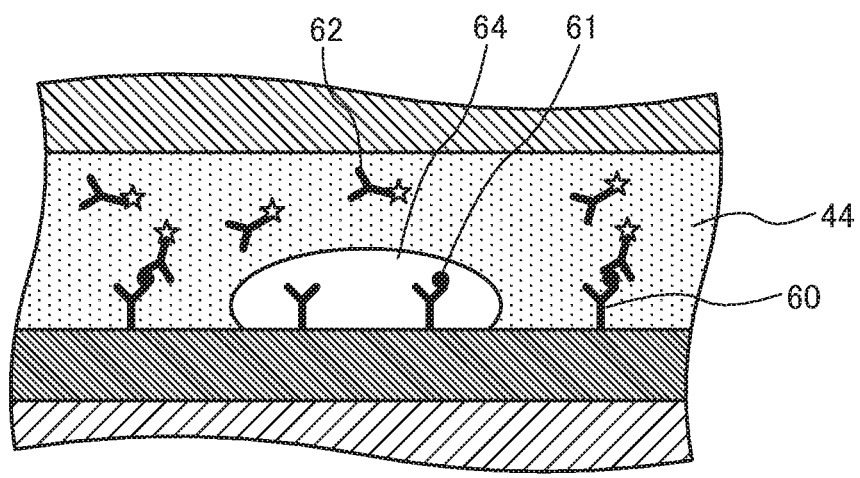
Figure 2A:
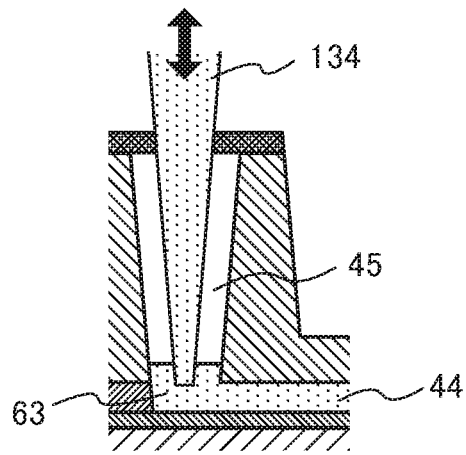
FIGS. 2A to 2D schematically illustrate a conventional liquid feeding method.
Figure 2B:
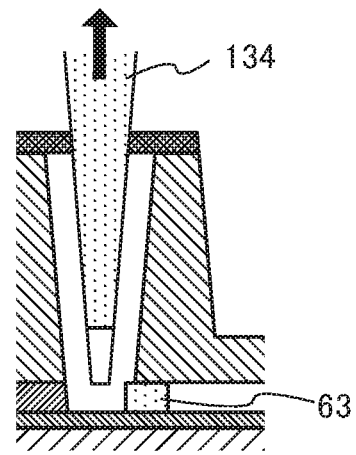
Figure 2C:
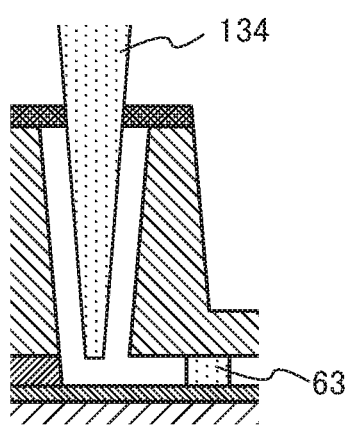
Figure 2D:
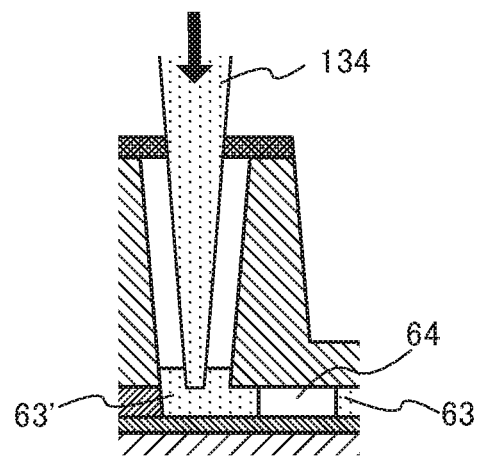
Figure 6B:
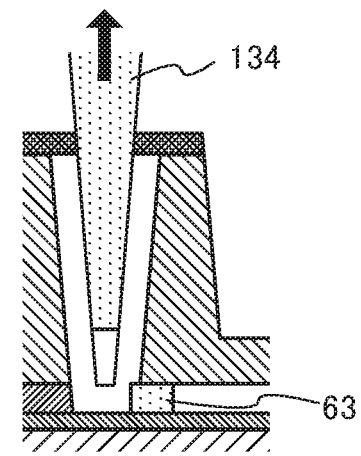
Figure 6B:
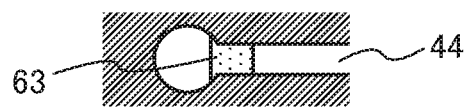
Figure 6C:
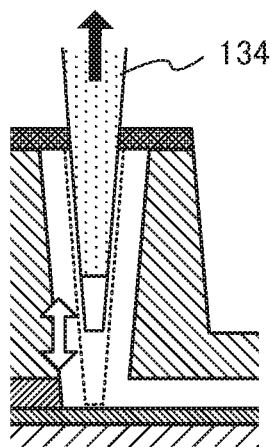
Figure 6C:
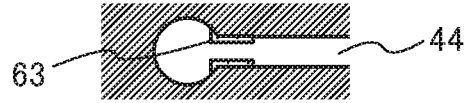

Next, as illustrated in FIG. 6B, liquid 63 in liquid injection section 45 is sucked by pipette chip 134 inserted in liquid injection section 45, and liquid 63 in flow path 44 is removed (step S110). This step is performed also in the state where no gap occurs between liquid injection section cover film 42 and pipette chip 134. This step removes a large part of liquid 63 in liquid injection section 45, flow path 44 and reservoir section 46. However, since the position of pipette chip 134 is fixed, liquid 63 often remains slightly at the bottom of liquid injection section 45 and at the end of flow path 44 nearer to liquid injection section 45. As described above, if new liquid is injected as it is, bubble 64 occurs in flow path 44 (see FIGS. 2C and 2D). If bubble 64 thus occurs in flow path 44, there is a possibility that the reaction cannot appropriately occur in flow path 44, and the fluorescent light cannot appropriately be detected (see FIGS. 12 and 13). Accordingly, the liquid feeding method according to this embodiment performs pipette chip reciprocating movements in order to prevent bubble 64 from occurring.

Next, as illustrated in FIG. 6C, pipette chip 134 is moved in the reciprocating manner (vertically moved) along the axial direction of pipette chip 134 two or more times (step S120). The fluid (remaining liquid 63 and air) in liquid injection section 45 is sucked by pipette chip 134 at last one time during this movement. This step is performed also in the state where no gap occurs between liquid injection section cover film 42 and pipette chip 134. The reciprocating movement of pipette chip 134 varies the pressure in liquid injection section 45, and changes the position of liquid 63 remaining in liquid injection section 45 or flow path 44. Accordingly, liquid 63 which pipette chip 134 does not reach can also be sucked. In case flow path 44 is blocked with liquid 63 remaining in flow path 44 as illustrated in the lower diagram of FIG. 6B, an air ventilation passage is formed as shown in the lower diagram of FIG. 6C. As a result, the amount of liquid 63 remaining in liquid injection section 45 and flow path 44 decreases, and bubble 64 does not occur in flow path 44 even if new liquid is subsequently injected.

In this Description, "pipette chip reciprocating movement" means that the upward movement and the downward movement are alternately repeated. For example, in a case where the reciprocating movement is performed twice, the upward movement, the downward movement, the upward movement, and the downward movement are performed in the order presented, or the downward movement, the upward movement, the downward movement, and the upward movement are performed in the order presented. As described above, the direction in which the pipette chip is moved at the first time may be upward or downward. The position of the pipette chip before the reciprocating movement and the position of the pipette chip after the reciprocating movement may be identical to or different from each other.

The number of reciprocating movements is not specifically limited only if the number is two or more. However, in view of sufficiently exerting the effect of the reciprocating movements, it is preferable that the number be five or more. The movement distance of pipette chip 134 in the vertical direction in the reciprocating movement (the distance between the position of the distal end of pipette chip 134 at the time of being closest to the bottom of liquid injection section 45 and the position of the distal end of pipette chip 134 at the time of being most away from the bottom of liquid injection section 45) is not specifically limited. In view of sufficiently exerting the effect of reciprocating movement, it is preferable that the distance be 200 μm or more.

Pipette chip 134 may be moved in the reciprocating manner such that the distal end of pipette chip 134 cannot come into contact with the bottom of liquid injection section 45. Alternatively, pipette chip 134 may be moved in the reciprocating manner such that the distal end of pipette chip 134 can come into contact with the bottom of liquid injection section 45. In the latter case, pipette chip 134 is moved in the reciprocating manner such that contact and separation between the distal end of pipette chip 134 and the bottom of liquid injection section 45 can be repeated.

The number of times of sucking the fluid in liquid injection section 45 may be one. It is however preferable that the number be multiple. It is further preferable that the number be the same as the number of reciprocating movements. The timing of sucking the fluid during the reciprocating movement of pipette chip 134 is not specifically limited. However, in view of removing liquid 63 remaining in liquid injection section 45 and flow path 44, it is preferable that the timing be at a time of pipette chip 134 being closest to the bottom of liquid injection section 45, or during pipette chip 134 being moved toward the bottom of liquid injection section 45. In a case where the fluid in liquid injection section 45 is sucked multiple times, the sucking amount each time is not specifically limited. However, in view of removing liquid 63 remaining in liquid injection section 45 and flow path 44, it is preferable that the amount be 10 μL or more.

Next, pipette chip 134 having sucked old liquid 63 therein is taken out from liquid injection section 45, and old liquid 63 in pipette chip 134 is discharged (step S130). New liquid 63' is collected in pipette chip 134, and subsequently, pipette chip 134 retaining new liquid 63' is inserted through the opening section (the through-hole provided in liquid injection section cover film 42) into liquid injection section 45 (step S140).

Figure 6D:
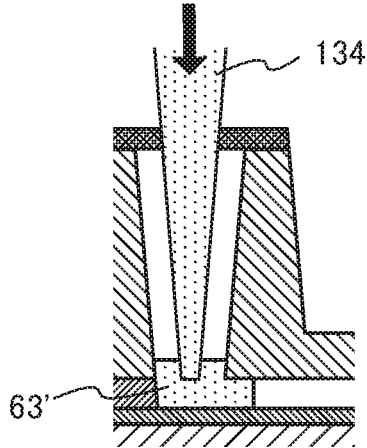
Figure 6D:
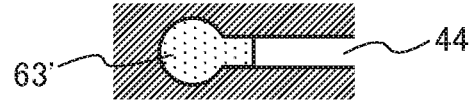

Next, as illustrated in FIG. 6D, liquid 63' is injected from pipette chip 134 inserted in liquid injection section 45, into liquid injection section 45, and liquid 63' is introduced into flow path 44 (step S150). This step is performed also in the state where no gap occurs between liquid injection section cover film 42 and pipette chip 134. As described above, even if old liquid 63 remains in flow path 44, the air ventilation passage is formed. Accordingly, there is no increase in pressure in liquid injection section 45 due to insertion of pipette chip 134 and the injection of new liquid 63', and old liquid 63 is not pushed toward reservoir section 46. Consequently, old liquid 63 remains at the position, and is mixed with new liquid 63' traveling in flow path 44. Accordingly, bubble 64 is not formed between old liquid 63 and new liquid 63' (see and compare FIGS. 2D and 6D).

The procedures described above can remove liquid 63 in flow path 44 and introduce liquid 63 into flow path 44 without causing a bubble in flow path 44.

In the case where pipette chip 134 is moved in the reciprocating manner such that the distal end of pipette chip 134 cannot come into contact with the bottom of liquid injection section 45 in the step (step S120) of moving pipette chip 134 in the reciprocating manner, it is preferable that the position of the bottom of liquid injection section 45 be detected in the previously performed step (step S110) of sucking liquid 63 in liquid injection section 45. For example, FIGS. 7A to 7D, in the step (step S110) of sucking liquid 63 in liquid injection section 45, the position of the bottom of liquid injection section 45 may be detected by bringing pipette chip 134 into contact with the bottom of liquid injection section 45 at least one time. For example, FIGS. 8A to 8D, in the step (step S110) of sucking liquid 63 in liquid injection section 45, the position of the bottom of liquid injection section 45 may be detected by moving pipette chip 134 toward the bottom of liquid injection section 45 while detecting the change in pressure in pipette chip 134. More specifically, if liquid 63 is sucked while the distal end of pipette chip 134 is moved toward the bottom of liquid injection section 45, the degree of the negative pressure significantly increases immediately before the distal end of pipette chip 134 comes into contact with the bottom of liquid injection section 45. The position of the bottom of liquid injection section 45 can be detected by the change in the degree of the negative pressure.

Figure 7A:
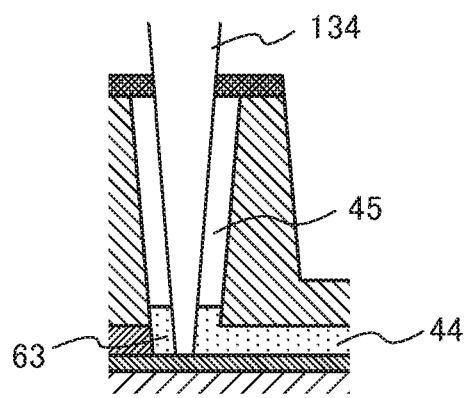
FIGS. 7A to 7D schematically illustrate a liquid feeding method according to a variation example of this embodiment.
Figure 7B:
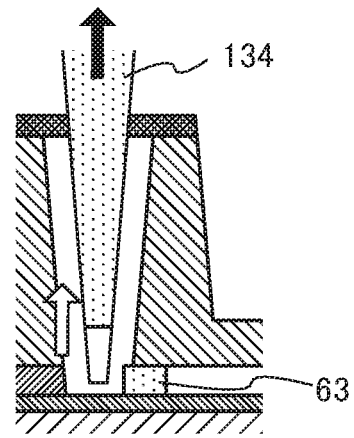
Figure 7C:
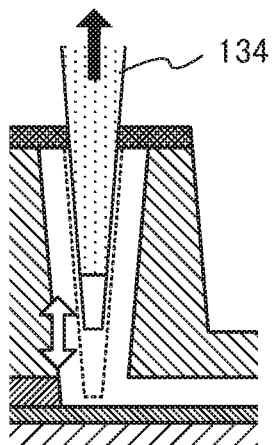
Figure 7D:
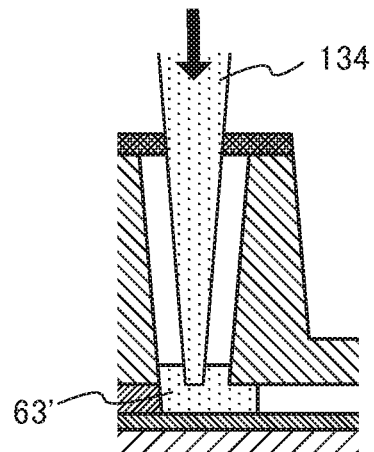

FIGS. 7A to 7D schematically illustrate a variation example of the liquid feeding method according to this embodiment. In this variation example, as illustrated in FIG. 7A, before sucking of liquid 63 is started, the distal end of pipette chip 134 is brought into contact with the bottom of liquid injection section 45. In this state, sucking of liquid 63 is started. Subsequently, as illustrated in FIG. 7B, pipette chip 134 is moved toward the opening section of liquid injection section 45. In the state where the distal end of pipette chip 134 is in contact with the bottom of liquid injection section 45, the degree of the negative pressure in pipette chip 134 is high. When the distal end of pipette chip 134 is apart from the bottom of liquid injection section 45, the degree of the negative pressure in pipette chip 134 significantly decreases. Consequently, the position of the bottom of liquid injection section 45 can be detected by measuring the pressure of pipette chip 134 or syringe pump 135. As described above, the liquid feeding method according to this variation example detects the position of the bottom of liquid injection section 45 at the same time in the step (step S110) of sucking liquid 63 in liquid injection section 45. As illustrated in FIG. 7C, in the step (step S120) of moving pipette chip 134 in the reciprocating manner, pipette chip 134 is moved in the reciprocating manner such that the distal end of pipette chip 134 cannot come into contact with the bottom of liquid injection section 45. The subsequent steps (steps S130 to S150) are the same as the steps having already been described (see FIG. 7D).

Figure 8A:
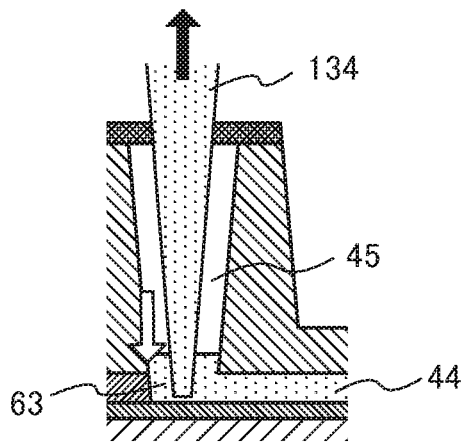
FIGS. 8A to 8D schematically illustrate a liquid feeding method according to a variation example of this embodiment.
Figure 8B:
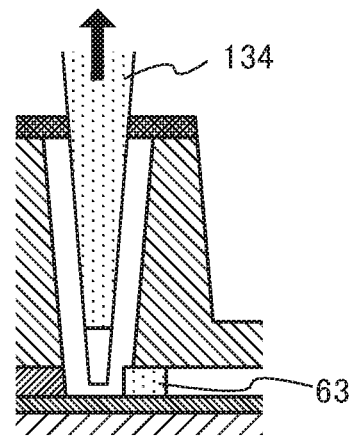
Figure 8C:
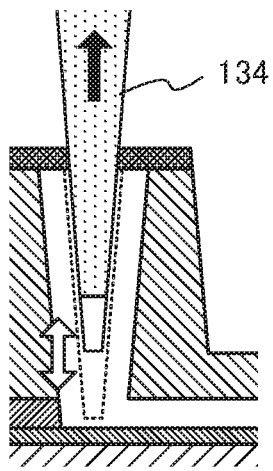
Figure 8D:
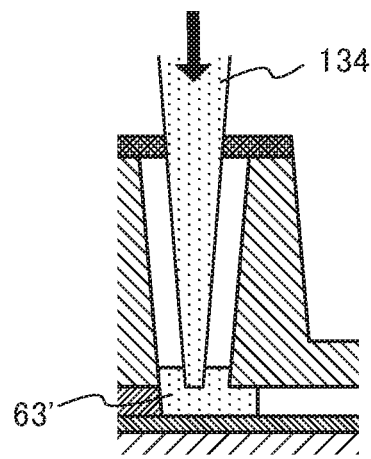

FIGS. 8A to 8D schematically illustrate a liquid feeding method according to a variation example of this embodiment. In this variation example, as illustrated in FIG. 8A, the distal end of pipette chip 134 is moved toward the bottom of liquid injection section 45 while liquid 63 is sucked. The position of the distal end of pipette chip 134 in a case where the degree of the negative pressure in pipette chip 134 is significantly increased is determined as the position of the bottom of liquid injection section 45. Subsequently, as illustrated in FIG. 8B, in a state where the position of the distal end of pipette chip 134 is apart from the bottom of liquid injection section 45, liquid 63 is sucked (step S110). As illustrated in FIG. 8C, in the step (step S120) of moving pipette chip 134 in the reciprocating manner, pipette chip 134 is moved in the reciprocating manner such that the distal end of pipette chip 134 cannot come into contact with the bottom of liquid injection section 45. The subsequent steps (steps S130 to S150) are the same as the steps having already been described (see FIG. 8D).

In a case where old liquid 63 in pipette chip 134 is replaced with new liquid 63' with pipette chip 134 being inserted in liquid injection section 45, or in a case where old liquid 63 having been sucked into pipette chip 134 from flow path 44 is reintroduced into flow path 44, steps S130 and S140 may be omitted.

(Detection Method)

Figure 9:
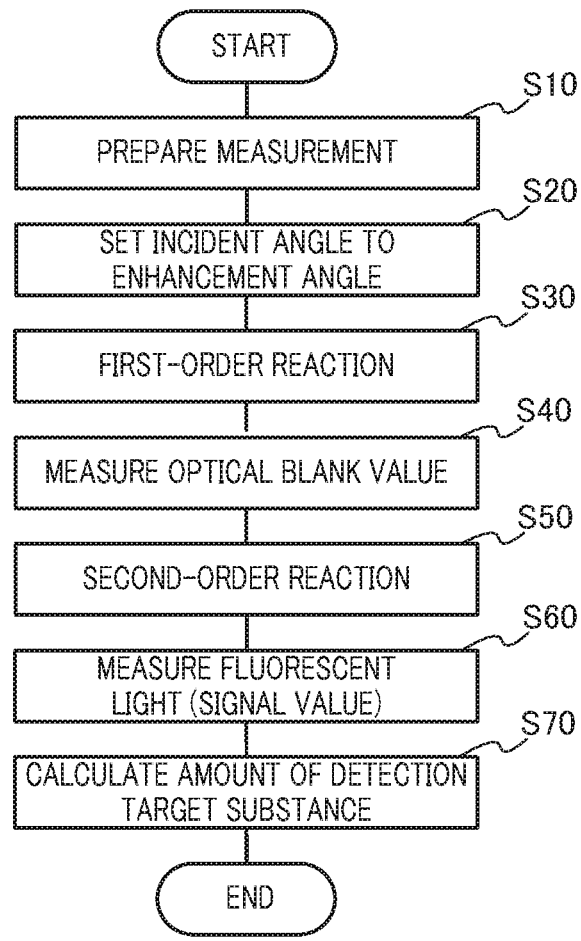
FIG. 9 is a flowchart illustrating a flowchart of a detection method according to one embodiment of the present invention, and is a flowchart of an example of operation procedures of the detection apparatus.

Next, a method of detecting the detection target substance using SPFS apparatus 100 (the detection apparatus, and the detection system) is described. FIG. 9 is a flowchart illustrating an example of the operation procedures of SPFS apparatus 100 in a case where the detection method in this embodiment is performed.

First, detection is prepared (step S10). More specifically, detection chip 10 described above is installed in chip holder 142 of SPFS apparatus 100. In a case where a moisturizer resides in flow path 44 of detection chip 10, flow path 44 is washed to remove the moisturizer.

Next, the incident angle of excitation light α to metal film 30 (film-formed surface 22) of detection chip 10 is set to the enhancement angle (step S20). More specifically, control section 150 controls conveyance stage 141 to move detection chip 10 from an installation position to a detection position. Subsequently, control section 150 controls light source controller 113 and angle adjustment mechanism 112 to sweep the incident angle of excitation light α to metal film 30 (film-formed surface 22) while irradiating a predetermined position on metal film 30 (film-formed surface 22) with excitation light α from light source unit 111. At this time, control section 150 controls position switching mechanism 122 to move optical filter 125 to the outside of the optical path of light receiving unit 121. Meanwhile, control section 150 controls sensor controller 123 to cause light receiving sensor 127 to detect plasmon scattered light γ. Control section 150 obtains data including the relationship between the incident angle of excitation light α and the intensity of plasmon scattered light γ. Control section 150 then analyzes the data, and determines the incident angle (enhancement angle) where the intensity of the plasmon scattered light γ becomes the maximum. Lastly, control section 150 controls angle adjustment mechanism 112 to set, to the enhancement angle, the incident angle of excitation light α to metal film 30 (film-formed surface 22).

The enhancement angle is determined by the material and shape of prism 20, the thickness of metal film 30, the refraction index of liquid in flow path 44 and the like, and slightly varies owing to various factors, such as the type and amount of liquid in flow path 44, the shape error of prism 20 and the like. Accordingly, it is preferable to determine the enhancement angle at every detection. The enhancement angle is determined on the order of about 0.1°.

Next, the specimen is provided into flow path 44 of detection chip 10 according to the liquid feeding method described above, and the detection target substance contained in the specimen is specifically bonded to the first capturing bodies fixed onto metal film 30 in detection chip 10 (first-order reaction (step S30)). After the detection target substance is bonded, buffer solution or the like is provided into flow path 44 according to the liquid feeding method described above to wash the inside of flow path 44 and remove the free detection target substance and the like.

The types of the specimen and the detection target substance are not specifically limited. Examples of the specimen include body fluid, such as blood, serum, plasma, urine, nostril fluid, saliva, and semen, and their diluted solutions. The examples of the detection target substance contained in the specimens include nucleic acids (DNA, RNA, etc.), proteins (polypeptides, oligopeptides, etc.), amino acids, carbohydrates, lipids, and their modifying molecules.

Next, an optical blank value is measured (step S40). More specifically, control section 150 controls conveyance stage 141 to move detection chip 10 from the installation position to the detection position. Subsequently, control section 150 controls light source controller 113 to cause light source unit 111 to emit excitation light α at the enhancement angle toward metal film 30 (film-formed surface 22). At the same time, control section 150 controls sensor controller 123 to cause light receiving sensor 127 to detect the light intensity of the light, and records the detected value as the blank value.

Next, the second capturing bodies labeled with the fluorescent substance are bonded to the detection target substance bonded to the first capturing bodies on metal film 30 (second-order reaction (step S50)). More specifically, control section 150 controls conveyance stage 141 to move detection chip 10 from the detection position to the liquid feeding position. Subsequently, control section 150 controls pipette controller 133 to provide the label liquid containing the second capturing bodies into flow path 44 according to the liquid feeding method described above. Here, the second capturing bodies are a substance to be specifically bonded to a site of the detection target substance, the site being different from the site to which the first capturing bodies are to be specifically bonded. The fluorescent substance is bonded to the second capturing bodies. Consequently, when the label liquid is provided into flow path 44, the second capturing bodies are specifically bonded to the detection target substance bonded to the first capturing bodies, and the detection target substance is indirectly labeled with the fluorescent substance. After the detection target substance is labeled with the fluorescent substance, buffer solution or the like is provided into flow path 44 according to the liquid feeding method described above to wash the inside of flow path 44 and remove the free second capturing bodies and the like.

The second capturing bodies may be any substance that can be specifically bonded to a site of the detection target substance, the site being different from the site to which the first capturing bodies are to be specifically bonded. The second capturing bodies may be biomolecules specific to the detection target substance, or their fragments. The second capturing body may be made up of one molecule, or a complex made up of two or more molecules bonded to each other.

Next, in the state where the detection target substance labeled with the fluorescent substance is disposed on the bottom surface (metal film 30) of flow path 44 via the first capturing bodies, metal film 30 (film-formed surface 22) is irradiated with excitation light α at the enhancement angle through prism 20. The value of the fluorescent light from the fluorescent substance with which the detection target substance is labeled is measured (step S60). More specifically, control section 150 controls conveyance stage 141 to move detection chip 10 from the liquid feeding position to the detection position. Subsequently, control section 150 controls light source controller 113 to cause light source unit 111 to emit excitation light α toward metal film 30 (film-formed surface 22). At the same time, control section 150 controls sensor controller 123 to cause light receiving sensor 127 to detect the light intensity of the light having the same wavelength as fluorescent light β.

Lastly, the presence or amount of the detection target substance is calculated (step S70). The fluorescent light value mainly includes the fluorescent light component (signal value) originated from the fluorescent substance with which the detection target substance is labeled, and the optical blank value. Consequently, control section 150 can calculate the signal value correlated to the amount of the detection target substance by subtracting the optical blank value obtained in step S40 from the fluorescent light value obtained in step S60. The value is converted into the amount or concentration of the detection target substance or the like using a preliminarily created calibration curve.

According to the procedures described above, the presence or amount of the detection target substance included in the specimen can be detected.

(Effects)

As described above, the liquid feeding method in this embodiment can remove the liquid in the flow path and introduce the liquid into the flow path without causing a bubble in the flow path. Consequently, the detection apparatus (detection system) and the detection method that use the liquid feeding method in this embodiment can suppress the adverse effect of the bubble due to reduction in the signal, and highly accurately detect the detection target substance.

In the embodiment described above, the detection apparatus and the detection method that use SPFS have been described. The detection method and the detection apparatus are not limited thereto. The present invention is also applicable to detection apparatuses and detection methods that use the ELISA method, RIfS method, SPR method, QCM, etc.

Hereinafter, the present invention is described in detail with reference to Examples. However, the present invention is not limited by these Examples.

EXAMPLES

In the following Examples 1 to 8, through use of the detection chip having the configuration illustrated in FIG. 4, the liquid was removed from the flow path, and the pipette chip was moved in the reciprocating manner, and subsequently the amount of liquid remaining in the liquid injection section and the flow path was measured. Subsequently, the liquid was introduced into the flow path, and it was observed whether a bubble occurred in the flow path or not. Likewise, in the following Comparative Examples 1 and 2, through use of the same detection chip, only removal of the liquid from the flow path was performed, and subsequently the amount of liquid remaining in the liquid injection section and the flow path was measured. Subsequently, the liquid was introduced into the flow path, and it was observed whether a bubble occurred in the flow path or not.

Example 1

In a state where the pipette chip was positioned such that the distal end of the pipette chip was disposed at a position 200 µm from the bottom surface of the liquid injection section of the detection chip, the liquid of 200 µL in the liquid injection section was sucked at a rate of 500 µL/min. to remove the liquid in the flow path (see FIGS. 6A and 6B).

Next, a step of moving the pipette chip downward by 200 µm and subsequently moving this chip upward by 200 µm was repeated five times (see FIG. 6C). According to a program, it is configured so as to move the pipette chip by 400 µm, thus moving this chip to a position 200 µm below the bottom surface of the liquid injection section. In actuality, when the pipette chip is moved 200 µm downward, this chip comes into contact with the bottom surface of the liquid injection section. Consequently, this chip cannot be moved downward any more. Through such a configuration of the program, an experiment was performed where the distal end of the pipette chip securely came into contact with the bottom surface of the liquid injection section. During five reciprocating movements, no gap occurred between the opening section of the liquid injection section (the through-hole provided in the liquid injection section cover film) and the pipette. The fluid of 15 µL in the liquid injection section was sucked every downward movement of the pipette chip (movement and sucking were performed at the same timing).

Subsequently, the amount of liquid remaining in the liquid injection section and the flow path was measured. The remaining liquid amount ranged from 1.5 to 3.0 µL. The liquid was introduced into the flow path, and it was observed whether a bubble occurred in the flow path or not. Not a single bubble occurred in the flow path (see Table 1).

Example 2

The liquid in the flow path was removed according to procedures similar to those in Example 1 except in that during five reciprocating movements, the pipette chip was moved downward, and subsequently the fluid of 15 µL in the liquid injection section was sucked each time (movement and sucking were performed at different timings).

Subsequently, the amount of liquid remaining in the liquid injection section and the flow path was measured. The remaining liquid amount ranged from 1.5 to 3.2 µL. The liquid was introduced into the flow path, and it was observed whether a bubble occurred in the flow path or not. Not a single bubble occurred in the flow path (see Table 1).

Example 3

The liquid in the flow path was removed according to procedures similar to those in Example 2 except in that the number of pipette chip reciprocating movements was two.

Subsequently, the amount of liquid remaining in the liquid injection section and the flow path was measured. The remaining liquid amount ranged from 1.7 to 3.8 µL. The liquid was introduced into the flow path, and it was observed whether a bubble occurred in the flow path or not. Not a single bubble occurred in the flow path (see Table 1).

Example 4

The liquid in the flow path was removed according to procedures similar to those in Example 2 except in that the number of pipette chip reciprocating movements was three.

Subsequently, the amount of liquid remaining in the liquid injection section and the flow path was measured. The remaining liquid amount ranged from 1.7 to 3.5 µL. The liquid was introduced into the flow path, and it was observed whether a bubble occurred in the flow path or not. Not a single bubble occurred in the flow path (see Table 1).

Example 5

The liquid in the flow path was removed according to procedures similar to those in Example 2 except in that the number of pipette chip reciprocating movements was four.

Subsequently, the amount of liquid remaining in the liquid injection section and the flow path was measured. The remaining liquid amount ranged from 1.6 to 3.2 µL. The liquid was introduced into the flow path, and it was observed whether a bubble occurred in the flow path or not. Not a single bubble occurred in the flow path (see Table 1).

Example 6

The liquid in the flow path was removed according to procedures similar to those in Example 1 (see FIGS. 6A and 6B). Next, the pipette chip was moved upward by 300 µm one time. Next, a step of moving the pipette chip downward by 400 µm and subsequently moving this chip upward by 400 µm was repeated five times (see FIG. 6C). During five reciprocating movements, the pipette chip did not come into contact with the bottom surface of the liquid injection section. During five reciprocating movements, no gap occurred between the opening section of the liquid injection section (the through-hole provided in the liquid injection section cover film) and the pipette. As with Example 2, during five reciprocating movements, the pipette chip was moved downward, and subsequently the fluid of 15 µL in the liquid injection section was sucked each time (movement and sucking were performed at different timings).

Subsequently, the amount of liquid remaining in the liquid injection section and the flow path was measured. The remaining liquid amount ranged from 1.7 to 3.4 µL. The liquid was introduced into the flow path, and it was observed whether a bubble occurred in the flow path or not. Not a single bubble occurred in the flow path (see Table 1).

Example 7

In a state where the pipette chip was positioned such that the distal end of the pipette chip was in contact with the bottom surface of the liquid injection section of the detection chip, the syringe pump was operated to suck 80 µL at a rate of 4,800 µL/min., thereby causing the inside of the pipette chip to have a negative pressure (see FIG. 7A). According to a program, it is configured such that the distal end of the pipette chip can be 100 µm below the bottom surface of the liquid injection section. In actuality, the pipette chip cannot be moved downward from the bottom surface of the liquid injection section. Through such a configuration of the program, an experiment was performed where the distal end of the pipette chip securely came into contact with the bottom surface of the liquid injection section.

Figure 10:
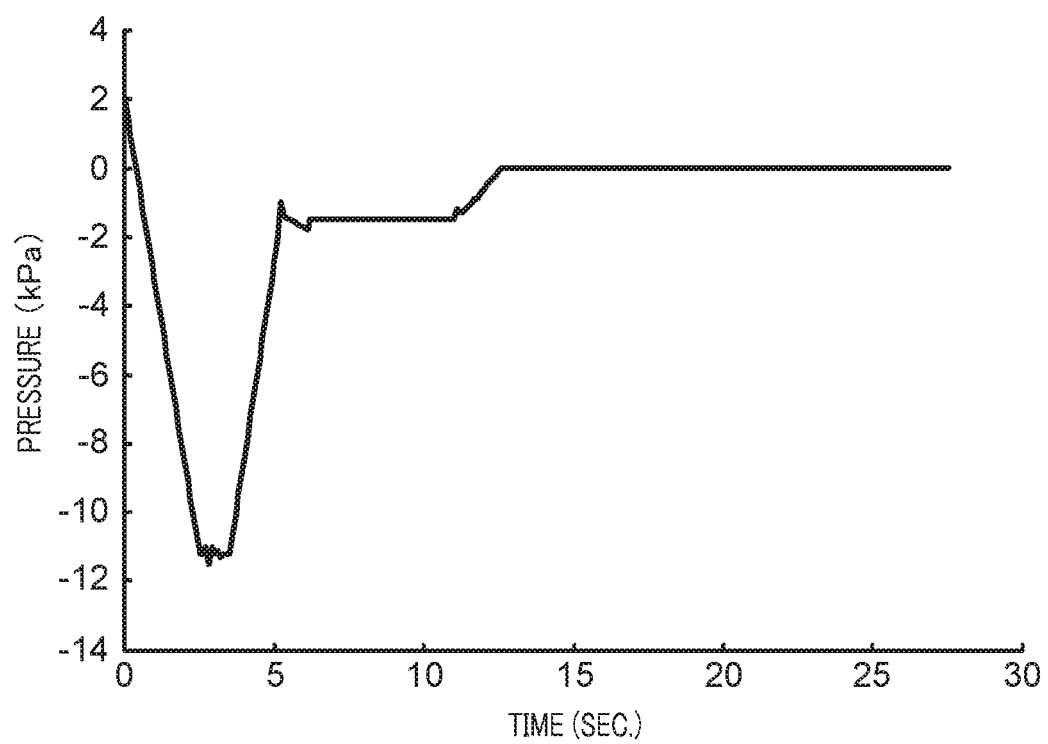
FIG. 10 is a graph illustrating temporary change in pressure in a pipette chip.

Next, the pipette chip was moved upward until the negative pressure in the pipette chip was canceled, and the position of the bottom surface of the liquid injection section was detected. Subsequently, in a state where the position of the pipette chip was as it was, the liquid of 120 µL in the liquid injection section was sucked at a rate of 500 µL/min. to remove the liquid in the flow path (see FIG. 7B). FIG. 10 is a graph illustrating temporary change in pressure in a pipette chip. The abscissa axis indicates the time, and the ordinate axis indicates the differential pressure from the atmospheric pressure. This graph shows that when the distal end of the pipette chip was apart from the bottom surface of the liquid injection section (at a time point ranging from 4 to 5 sec.), the negative pressure in the pipette chip was cancelled.

Next, a step of moving the pipette chip upward by 400 µm and subsequently moving this chip downward by 400 µm was repeated five times (see FIG. 7C). During five reciprocating movements, the pipette chip did not come into contact with the bottom surface of the liquid injection section. During five reciprocating movements, no gap occurred between the opening section of the liquid injection section (the through-hole provided in the liquid injection section cover film) and the pipette. As with Example 1, the fluid of 15 µL in the liquid injection section was sucked every downward movement of the pipette chip (movement and sucking were performed at the same timing).

Subsequently, the amount of liquid remaining in the liquid injection section and the flow path was measured. The remaining liquid amount ranged from 1.5 to 3.0 µL. The liquid was introduced into the flow path, and it was observed whether a bubble occurred in the flow path or not. Not a single bubble occurred in the flow path (see Table 1).

Example 8

Figure 11:
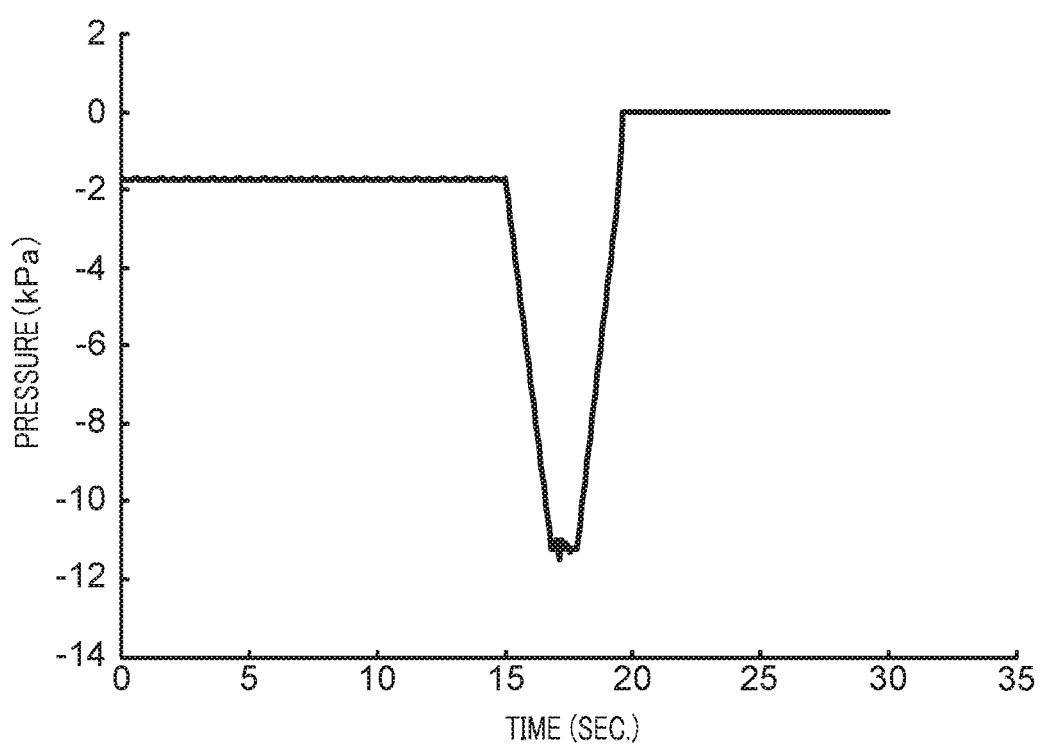
FIG. 11 is a graph illustrating temporary change in pressure in the pipette chip.

In a state where the pipette chip was positioned such that the distal end of the pipette chip was disposed at a position about 500 µm from the bottom surface of the liquid injection section of the detection chip, the liquid of 80 µL in the liquid injection section was sucked at a rate of 500 µL/min. while pipette chip was stepwisely moved downward by 50 µm each time at a rate of 8 mm/sec. (see FIG. 8A). The pipette chip was moved downward until the negative pressure in the pipette chip was significantly increased, and the position of the bottom surface of the liquid injection section was detected. Subsequently, after the position of the pipette chip was moved upward by 100 µm, the liquid of 120 µL in the liquid injection section was sucked at a rate of 500 µL/min. to remove the liquid in the flow path (see FIG. 8B). FIG. 11 is a graph illustrating temporary change in pressure in the pipette chip. The abscissa axis indicates the time, and the ordinate axis indicates the differential pressure from the atmospheric pressure. This graph shows that when the distal end of the pipette chip approaches the bottom surface of the liquid injection section (at a time point ranging from 15 to 17 sec.), the negative pressure in the pipette chip was significantly increased.

Next, a step of moving the pipette chip upward by 400 µm and subsequently moving this chip downward by 400 µm was repeated five times (see FIG. 8C). During five reciprocating movements, the pipette chip did not come into contact with the bottom surface of the liquid injection section. During five reciprocating movements, no gap occurred between the opening section of the liquid injection section (the through-hole provided in the liquid injection section cover film) and the pipette. As with Example 1, the fluid of 15 µL in the liquid injection section was sucked every downward movement of the pipette chip (movement and sucking were performed at the same timing).

Subsequently, the amount of liquid remaining in the liquid injection section and the flow path was measured. The remaining liquid amount ranged from 1.5 to 3.0 µL. The liquid was introduced into the flow path, and it was observed whether a bubble occurred in the flow path or not. Not a single bubble occurred in the flow path (see Table 1).

Comparative Example 1

The liquid in the flow path was removed according to procedures similar to those in Example 1 except in that the five reciprocating movements were not performed.

Subsequently, the amount of liquid remaining in the liquid injection section and the flow path was measured. The remaining liquid amount ranged from 3.5 to 6.0 µL. The liquid was introduced into the flow path, and it was observed whether a bubble occurred in the flow path or not. A bubble occurred in the flow path (see Table 1).

Comparative Example 2

The liquid in the flow path was removed according to procedures similar to those in Example 1 except in that the number of pipette chip reciprocating movements was one.

Subsequently, the amount of liquid remaining in the liquid injection section and the flow path was measured. The remaining liquid amount ranged from 2.5 to 4.8 µL. The liquid was introduced into the flow path, and it was observed whether a bubble occurred in the flow path or not. A bubble occurred in the flow path (see Table 1).

TABLE 1

| | Bottom surface position detection | Liquid suction Sucking position | Reciprocating movement of pipette | | | | |
|---|---|---|---|---|---|---|---|
| | | | The number of reciprocating movements | Contact with bottom surface | Sucking timing | Remaining liquid amount (µL) | Bubble occurrence |
| Example 1 | Absent | 200 µm upward from bottom surface | 5 | Present | During movement | 1.5 to 3.0 | Absent |
| Example 2 | Absent | 200 µm upward from bottom surface | 5 | Present | After movement | 1.5 to 3.2 | Absent |

TABLE 1-continued

| | | Reciprocating movement of pipette | | | | |
|---|---|---|---|---|---|---|
| | Bottom surface position detection | Liquid suction Sucking position | The number of reciprocating movements | Contact with bottom surface | Sucking timing | Remaining liquid amount (μL) | Bubble occurrence |
| Example 3 | Absent | 200 μm upward from bottom surface | 2 | Present | After movement | 1.7 to 3.8 | Absent |
| Example 4 | Absent | 200 μm upward from bottom surface | 3 | Present | After movement | 1.7 to 3.5 | Absent |
| Example 5 | Absent | 200 μm upward from bottom surface | 4 | Present | After movement | 1.6 to 3.2 | Absent |
| Example 6 | Absent | 200 μm upward from bottom surface | 5 | Absent | After movement | 1.7 to 3.4 | Absent |
| Example 7 | Present (reduction in negative pressure) | Negative pressure reduction position | 5 | Absent | During movement | 1.5 to 3.0 | Absent |
| Example 8 | Present (increase in negative pressure) | 100 μm upward from negative pressure increase position | 5 | Absent | During movement | 1.5 to 3.0 | Absent |
| Comparative Example 1 | Absent | 200 μm upward from bottom surface | 0 | — | — | 3.5 to 6.0 | Present |
| Comparative Example 2 | Absent | 200 μm from bottom surface | 1 | Present | During movement | 2.5 to 4.8 | Present |

The results of these Examples and Comparative Examples shows that sucking of the liquid in the liquid injection section and the flow path, and subsequent sucking with the pipette chip reciprocating movement being performed two or more times can reduce the amount of remaining liquid in the liquid injection section and the flow path, and prevent the bubble from occurring in the flow path. The results also show that sucking, with the pipette chip being moved downward, during the pipette chip reciprocating movements can further reduce the remaining liquid amount (Examples 1, 7 and 8).

Figure 12:
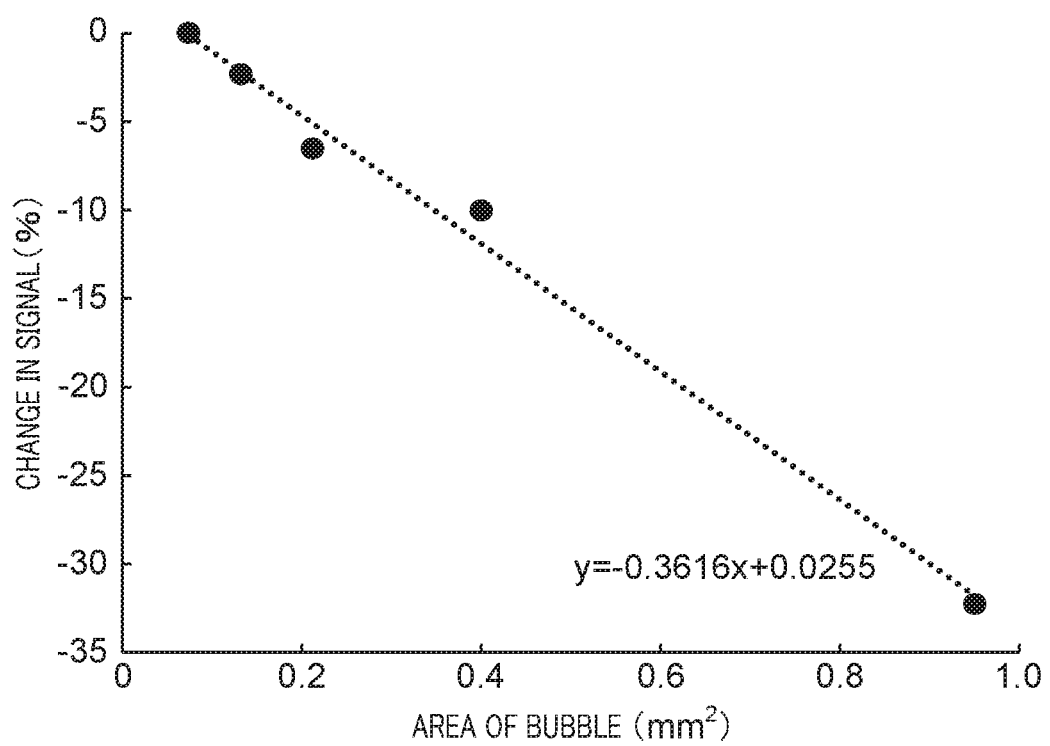
FIG. 12 is a graph illustrating the relationship between the area of bubbles in a measurement region on the flow path and the rate of reduction in the signal value in a case of a first-order reaction.
Figure 13:
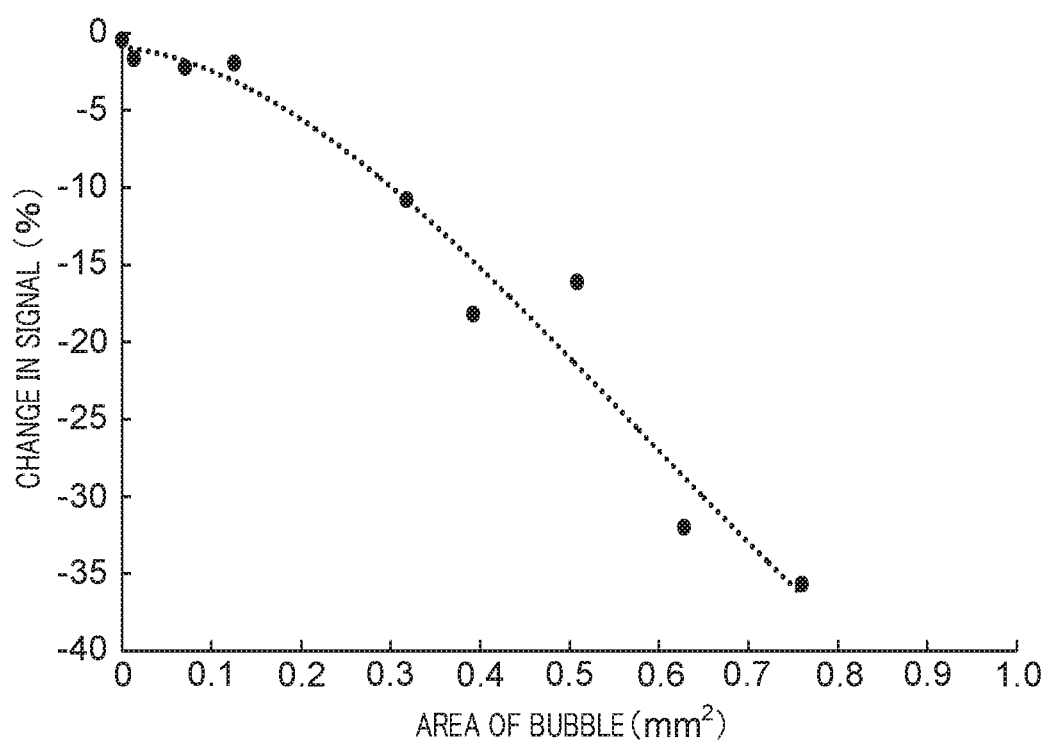
FIG. 13 is a graph illustrating the relationship between the area of bubbles in a measurement region on the flow path and the rate of reduction in the signal value during signal measurement.

FIGS. 12 and 13 are graphs illustrating the adverse effects of the bubble against the signal value in a case where liquid was fed according to the procedures in Comparative Example 1 and the SPFS detected the detection target substance. FIG. 12 is the graph illustrating the relationship between the area of bubbles in the measurement region (the area where the first capturing bodies are fixed) on the flow path and change in signal value in a case of a first-order reaction. The dotted line represents a linear approximation curve. FIG. 13 is a graph illustrating the relationship between the area of bubbles in the measurement region on the flow path and the change in signal value during signal measurement. The dotted line represents a polynomial approximate curve. The graph illustrated in FIG. 12 shows that occurrence of a bubble in the flow path prevented the reaction from being appropriately performed, and reduced the signal value. The graph illustrated in FIG. 13 show that occurrence of a bubble in the flow path prevented the fluorescent light from being appropriately detected, and reduced the signal value.

INDUSTRIAL APPLICABILITY

The liquid feeding method, the detection system, and the detection apparatus according to the present invention can introduce the liquid into the flow path without causing a bubble in the flow path. Consequently, the liquid feeding method, the detection system, and the detection apparatus according to the present invention are significantly useful for the detection apparatus for detecting various detection target substances, a method of feeding a specimen to the detection apparatus, and the like.

REFERENCE SIGNS LIST

10 Detection chip
20 Prism
21 Light incident surface
22 Film-formed surface
23 Light emission surface
30 Metal film
40 Flow path cover
41 Frame
42 Liquid injection section cover film
43 Reservoir section cover film
44 Flow path
45 Liquid injection section
46 Reservoir section
47 Ventilation hole
50 Adhesive layer
60 First capturing body
61 Detection target substance
62 Second capturing body
63, 63' Liquid
64 Bubbles
100 SPFS apparatus
110 Light irradiation unit
111 Light source unit
112 Angle adjustment mechanism
113 Light source controller
120 Fluorescent light detection unit
121 Light receiving unit
122 Position switching mechanism 123 Sensor controller
124 First lens
125 Optical filter
126 Second lens
127 Light receiving sensor
130 Liquid feeding unit
131 Liquid chips
132 Pipette
133 Pipette controller
134 Pipette chip
135 Syringe pump
140 Conveyance unit
141 Conveyance stage
142 Chip holder
150 Control section
α Excitation light
β Fluorescent light
γ Plasmon scattered light

The invention claimed is:

1. A liquid feeding method, comprising:
a first step of sucking, by a pipette chip, liquid in a liquid injection section to remove liquid in a flow path in a state where no gap is between an opening section and the pipette chip, the pipette chip being inserted through the opening section into the liquid injection section of a detection chip, the detection chip including both the flow path and the liquid injection section communicating with one end of the flow path and having the opening section;
a second step of, after the first step, moving the pipette chip in a reciprocating manner two or more times along an axial direction of the pipette chip while ensuring that no gap occurs between the opening section and the pipette chip, the two or more times including at least one time where fluid in the liquid injection section is sucked by the pipette chip; and
a third step of, after the second step, injecting the liquid from the pipette chip into the liquid injection section to introduce the liquid into the flow path in a state where no gap is between the opening section and the pipette chip.

2. The liquid feeding method according to claim 1, wherein in the second step, the fluid in the liquid injection section is sucked by the pipette chip when the pipette chip is closest to a bottom of the liquid injection section.

3. The liquid feeding method according to claim 1, wherein in the second step, the fluid in the liquid injection section is sucked by the pipette chip, while the pipette chip is moved toward a bottom of the liquid injection section.

4. The liquid feeding method according to claim 1, wherein in the second step, the pipette chip is moved in the reciprocating manner such that the pipette chip can be in contact with a bottom of the liquid injection section.

5. The liquid feeding method according to claim 1, wherein in the first step, a position of a bottom of the liquid injection section is detected by bringing the pipette chip into contact with a bottom of the liquid injection section at least one time, and
in the second step, the pipette chip is moved in the reciprocating manner such that the pipette chip is not brought into contact with a bottom of the liquid injection section.

6. The liquid feeding method according to claim 1, wherein in the first step, a position of a bottom of the liquid injection section is detected by detecting a change in pressure in the pipette chip while the pipette chip is moved along the axial direction, and
in the second step, the pipette chip is moved in the reciprocating manner such that the pipette chip is not brought into contact with a bottom of the liquid injection section.

7. The liquid feeding method according to claim 1, wherein in the second step, the pipette chip is moved in the reciprocating manner five or more times.

8. The liquid feeding method according to claim 1, wherein in the second step, the fluid in the liquid injection section is sucked multiple times by the pipette chip, and
in the second step, a sucking amount per suction by the pipette chip is 10 μL or more.

9. The liquid feeding method according to claim 1, wherein in the second step, a distance between a position of a distal end of the pipette chip at a time of being closest to a bottom of the liquid injection section, and a position of the distal end of the pipette chip at a time of being most apart from the bottom of the liquid injection section is 200 μm or more.

10. A detection system, comprising:
a detection chip including both a flow path and a liquid injection section communicating with one end of the flow path and having an opening section;
a pipette configured to inject liquid into the liquid injection section and suck the liquid from the liquid injection section, with a pipette chip being mounted on a distal end of the pipet; and
a pipette controller configured to control the pipette,
wherein when the liquid is introduced into the flow path, the pipette controller causes the pipette to inject the liquid into the liquid injection section in a state where the pipette chip is inserted through the opening section into the liquid injection section while ensuring that no gap occurs between the opening section and the pipette chip, and
when the liquid is removed from the flow path, the pipette controller causes the pipette to suck the liquid in the liquid injection section in a state where the pipette chip is inserted through the opening section into the liquid injection section while ensuring that no gap occurs between the opening section and the pipette chip, and subsequently the pipette moves the pipette chip along an axial direction of the pipette chip in a reciprocating manner two or more times while ensuring that no gap occurs between the opening section and the pipette chip, the two or more times including at least one time where fluid in the liquid injection section is sucked.

11. A detection apparatus, comprising:
a chip holder configured to hold a detection chip including both a flow path and a liquid injection section communicating with one end of the flow path and having an opening section;
a pipette capable of being provided with a pipette chip mounted on a distal end of the pipette, the pipette being configured to inject liquid into the liquid injection section of the detection chip held by the chip holder, and suck the liquid from the liquid injection section; and
a pipette controller configured to control the pipette,
wherein when the liquid is introduced into the flow path, the pipette controller causes the pipette to inject the liquid into the liquid injection section in a state where the pipette chip is inserted through the opening section into the liquid injection section while ensuring that no gap occurs between the opening section and the pipette chip, and when the liquid is removed from the flow path, the pipette controller causes the pipette to suck the liquid in the liquid injection section in a state where the pipette chip is inserted through the opening section into the liquid injection section while ensuring that no gap occurs between the opening section and the pipette chip, and subsequently the pipette moves the pipette chip along an axial direction of the pipette chip in a reciprocating manner two or more times while ensuring that no gap occurs between the opening section and the pipette chip, the two or more times including at least one time where fluid in the liquid injection section is sucked.

* * * * *